(12) United States Patent
Kitada

(10) Patent No.: US 8,243,741 B2
(45) Date of Patent: Aug. 14, 2012

(54) FRAME SWITCHING DEVICE AND ADDRESS LEARNING METHOD

(75) Inventor: Atsushi Kitada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 203 days.

(21) Appl. No.: 12/536,678

(22) Filed: Aug. 6, 2009

(65) Prior Publication Data
US 2010/0040072 A1 Feb. 18, 2010

(30) Foreign Application Priority Data

Aug. 14, 2008 (JP) ................................ 2008-208935

(51) Int. Cl.
 *H04L 12/56* (2006.01)
(52) U.S. Cl. ................................. 370/395.54
(58) Field of Classification Search ............. 370/395.31, 370/400, 395.54, 389; 709/238, 242
See application file for complete search history.

(56) References Cited

U.S. PATENT DOCUMENTS

| | | | |
|---|---|---|---|
| 2003/0096577 A1* | 5/2003 | Heinonen et al. | 455/41 |
| 2004/0081083 A1 | 4/2004 | Sekihata | |
| 2006/0251065 A1 | 11/2006 | Hamamoto et al. | |
| 2008/0002625 A1* | 1/2008 | Cho et al. | 370/331 |

FOREIGN PATENT DOCUMENTS

| | | |
|---|---|---|
| JP | 2004-147172 | 5/2004 |
| JP | 2004-193821 | 7/2004 |
| JP | 2006-279820 | 10/2006 |

OTHER PUBLICATIONS

Japanese Office Action for corresponding Japanese application 2008-208935; mailed May 11, 2010.

* cited by examiner

*Primary Examiner* — Man Phan
*Assistant Examiner* — Kevin Lee
(74) *Attorney, Agent, or Firm* — Staas & Halsey LLP

(57) ABSTRACT

A frame switching device includes a plurality of ports sending a sending frame and receiving a receiving frame; an address entry memory storing an address entry; a flooding processor executing flooding process; a flooding determination unit determining whether the flooding occurrence for the address satisfies a predetermined condition; a notification transmitting unit transmitting a searching frame; a notification receiving unit for receiving a predetermined notification for the address entry related to the address in flooding occurrence from an other frame switching device; and an address entry registration unit registering the address entry in the address entry memory.

10 Claims, 23 Drawing Sheets

| MAC | Port |
|---|---|
| addr1 | p1 |
| addr2 | p3 |
| addr3 | p2 |

| PORT | ... | NETWORK TYPES | |
|---|---|---|---|
| p1 | ... | LAN | |
| p2 | ... | WAN | |
| p3 | ... | WAN | |
| ⋮ | ⋱ | ⋮ | |
| pn | ... | LAN | |

FIG. 13

| DA : 01-80-C2-00-00-0X |
|---|
| SA : SW MAC Addr |
| Ether_Type : XX-XX |
| Version : 0x01 |
| ID : IDENTIFIER OF A LAYER 2 SWITCH THAT FIRST TRANSMITS THE FRAME |
| Type : Req(SERCHING)/Reply(NOTIFYING) |
| MAC. ENTRY |

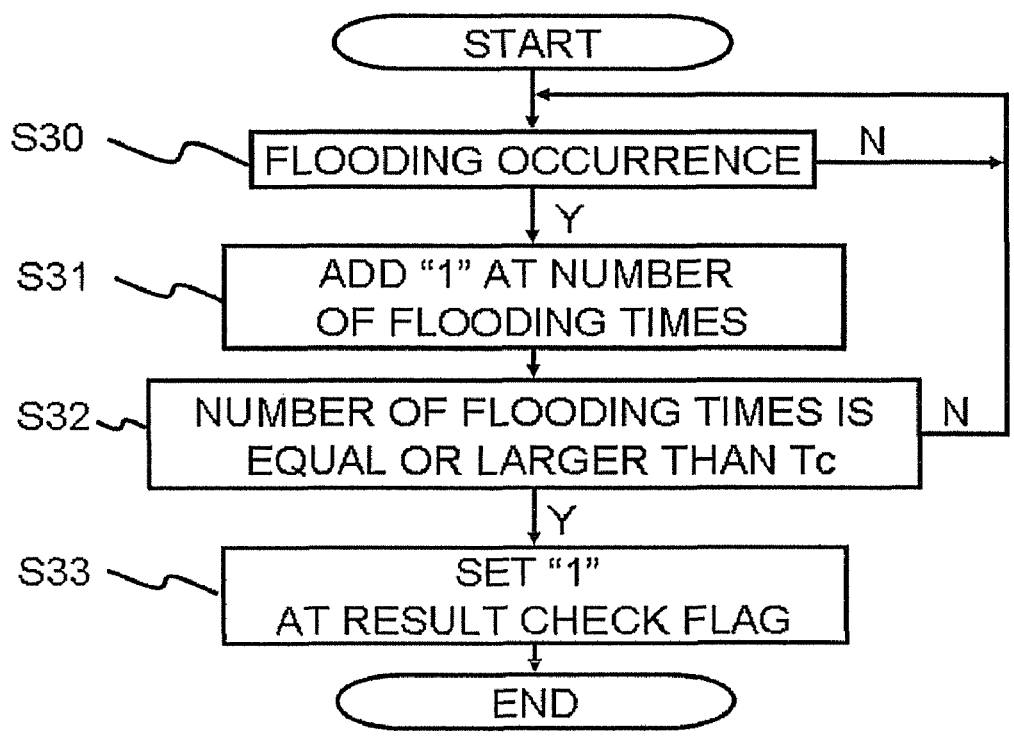

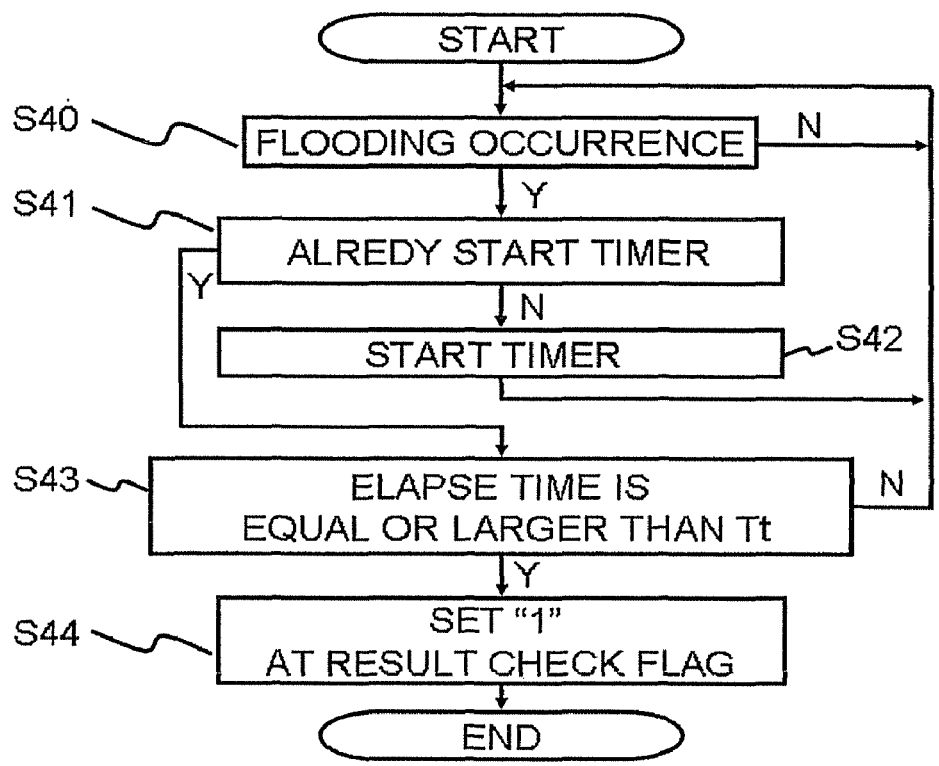

FIG. 25

| MAC | TRANSMISSION NUMBER | DELETION FLAG |
|---|---|---|
| a | 0 | 0 |
| b | 1 | 0 |
| c | 2 | 0 |
| d | 10 | 1 |
| | | |

| MAC | SEARCH TIME | DELETION FLAG |
|---|---|---|
| a | 100s | 1 |
| b | 5s | 0 |
| c | 30s | 0 |
| d | 45s | 0 |
|   |   |   |

FRAME SWITCHING DEVICE AND ADDRESS LEARNING METHOD

CROSS-REFERENCE TO RELATED APPLICATION

This application is based upon and claims the benefit of priority of the prior Japanese Patent Application No. 2008-208935, filed on Aug. 14, 2008, the entire contents of which are incorporated herein by reference.

FIELD

The embodiments discussed herein are related to a frame switching device.

BACKGROUND

The Ethernet (registered trademark) has been widely used on LANs such as an in-house LAN or in wide-area LAN services provided on, for example, L2-VPN by a communication carrier.

The wide-area LAN service is based on a network configured irrespective of Layer 3 protocol as an upper protocol. In other words, the service is based on an L3 topology-free network. Clients can freely design and operate the IP network.

The Clients can design a simple route using a static route as well as can dynamically control a route using, for example, a dynamic routing protocol such as RIP/OSPF (Routing Information Protocol/Open Shortest Path First).

Here, proposed is a ring switching method applied to a network configured by connecting Layer 2 switches having a route control function and a failure detecting mechanism in a ring shape, in which each Layer 2 switch includes an address learning table storing a MAC address and a corresponding port, and when a link failure is detected between adjacent Layer 2 switches, each of the adjacent Layer 2 switches sends a packet of a failure notification frame, and a target Layer 2 switch having received the failure notification frame records entry of MAC addresses into the switch in the failure notification frame and transfers the frame to the adjacent Layer 2 switch.

Further, proposed is a Layer 2 switch including a first controller and a second controller, in which if a Layer 2 switch positioned on a sender terminal side receives a broadcast-transferred frame, and the switch has learned a destination MAC address included in the frame and has not learned a sender MAC address, the first controller sends a virtual response frame intended to represent a response frame to be primarily sent from a destination terminal and the second controller deletes the virtual response frame received from the Layer 2 switch positioned on the sender terminal side.

Japanese Laid-open Patent publication No. 2004-147172 and Japanese Laid-open Patent publication No. 2006-279820 are related to background.

The Layer 2 switch as an Ethernet (registered trademark) switch as a MAC automatic learning function and automatically creates an MAC table. The MAC table is also called forwarding table or MAC address table.

FIG. 1A and FIG. 1B illustrate a conventional MAC learning method. A Layer 2 switch SW1 illustrated in FIG. 1A receives a MAC frame FR1 including a sender MAC address b and a destination MAC address "a".

The Layer 2 switch SW1 references the sender MAC address of the received MAC frame to learn which port is connected to a node having which MAC address.

In the illustrated example of FIG. 1B, the Layer 2 switch SW1 learns that a port p1 having received the MAC frame FR1 is connected to a node having the sender MAC address a of the received MAC frame FR1, and registers a correspondence relationship between the MAC address "a" and the port p1 in a MAC table MT1.

The Layer 2 switch SW1 determines an output port for outputting the received MAC frame FR1 based on the MAC table MT1 storing automatic learning results. If the sender MAC address is not registered in the MAC table MT1, the frame is output from all ports but the frame-received port. This processing is called flooding.

FIG. 2A and FIG. 2B illustrate flooding processing in the case where the sender MAC address has not been learned. The Layer 2 switch SW1 illustrated in FIG. 2A receives a MAC frame FR2 having a destination MAC address "c" and the sender MAC address "a" at the port p1.

The MAC table MT1 stored in the Layer 2 switch SW1 does not register the destination MAC address "c" of the received MAC frame FR2. Thus, the Layer 2 switch SW1 outputs the MAC frame FR2 from the other ports p2 and p3 than the frame-received port p1.

Forwarding a frame based on the automatic learning function of the Layer 2 switch facilitates network management operation but might cause undesirable flooding due to failed MAC learning with some Layer 3 topologies. FIG. 3 illustrates an example of a network that might cause flooding due to failed MAC learning.

The network illustrated in FIG. 3 is a wide-area LAN (L2-VPN) connecting a head office of a client company, a data center, an xx local office, and a ww branch with one another. In FIG. 3, Layer 2 switches SW1 to SW4 are networking components for MAC frame switching on the wide-area LAN (L2-VPN).

The head office LAN has a network address A/24 and is connected to the wire-area LAN through a router R-a connected to the Layer 2 switch SW4. The router R-a has a MAC address "a".

The data center LAN has a network address B/24 and is connected to the wire-area LAN through a router R-b connected to the Layer 2 switch SW3. The router R-b has a MAC address "b".

The xx local office LAN has a network address C/24 and is connected to the wire-area LAN through a router R-c connected to the Layer 2 switch SW2. The router R-b has a MAC address "c".

The ww branch LAN has a network address D/24 and is connected to the wire-area LAN through a router R-d connected to the Layer 2 switch SW1. The router R-b has a MAC address "d".

A port p1 of the Layer 2 switch SW4 connected to the head office LAN is connected to the router R-a, and a port 3 of the Layer 2 switch SW4 is connected to the adjacent Layer 2 switch SW3.

A port p1 of the Layer 2 switch SW3 connected to the data center LAN is connected to the router R-b, a port 2 of the Layer 2 switch SW3 is connected to the adjacent Layer 2 switch SW4, and a port 3 of the Layer 2 switch SW3 is connected to the adjacent Layer 2 switch SW2.

A port p1 of the Layer 2 switch SW2 connected to the xx local office LAN is connected to the router R-c, a port 2 of the Layer 2 switch SW2 is connected to the adjacent Layer 2 switch SW3, and a port 3 of the Layer 2 switch SW2 is connected to the adjacent Layer 2 switch SW1.

A port p1 of the Layer 2 switch SW1 connected to the ww branch LAN is connected to the router R-d, and a port 2 of the Layer 2 switch SW1 is connected to the adjacent Layer 2 switch SW2.

Reference symbols MT1 and MT2 denote MAC tables the Layer 2 switches SW1 and SW2 use for forwarding a frame. The MAC tables MT1 and MT2 represent which port is used to output a MAC frame having each MAC address as a destination address.

Routing tables RT1 to RT4 are routing tables the routers R-d to R-a use for routing a packet. The routing tables RT1 to RT4 includes an I/P field and a next hop field. For ease of illustration, the next hop is represented by "N.H." in the accompanying drawings.

The routing tables RT1 to RT4 stores network addresses in the I/P field, and the next hop field stores an IP address of a router as the next forwarding destination of a packet to be sent to a network indicated by the network address stored in the I/P field.

For example, the routing table RT4 indicates that the next forwarding destination of a packet addressed to the network address B/24 is the router R-b, indicates that the next forwarding destination of a packet addressed to the network address C/24 is the router R-c, and indicates that the next forwarding destination of a packet addressed to the network address D/24 is the router R-d.

Further, for example, the routing table RT3 indicates that the next forwarding destination of a packet addressed to the network address A/24 is the router R-a, indicates that the next forwarding destination of a packet addressed to the network address C/24 is the router R-c, and indicates that the next forwarding destination of a packet addressed to the network address D/24 is the router R-d.

In the example of the wire-area LAN illustrated in FIG. 3, the router R-c of the xx local office and the router Rd of the ww branch are given only a default router for sending a packet to the head office, and routing tables in the router R-a of the head office and the router R-c of the data center store all routes.

In addition, the router R-a of the head office distributes traffic from the xx local office and the ww branch. Such a network configuration is advantageous in that a static route does not need to be reconfigured each time a router is added or disconnected.

For example, in the case where a terminal on the ww branch LAN accesses the data center, packets sent from the ww branch toward the data center are first transmitted from the ww branch to the head office and then transferred from the head office to the data center as indicated by the dotted line in FIG. 3. Further, packets sent from the data center toward the ww branch are transmitted to the ww branch from the data center to the ww branch not through the router R-a of the head office as indicated by the dashed-dotted line in FIG. 3. Thus, traffic passes through different outward and return IP paths, between the ww branch and the data center. In other words, the traffic passes through asymmetric outward and return IP paths.

In the case of accessing the ww branch to the data center, the Layer 2 switches SW1 and SW2 on a path therebetween can learn the MAC address a of the router R-a in the head office LAN based on an address resolution protocol (ARP: Address Resolution Protocol) used by the router R-d of the ww branch.

However, a sender MAC address of a MAC header sent from the data center toward the ww branch is an address b of the router R-b of the data center LAN, and a frame having a MAC address a as a sender address is not transmitted in traffic between the data center and the ww branch. Thus, as a result of aging processing of the MAC table, entries regarding the MAC address a are deleted from the MAC table MT1 of the Layer 2 switch SW1 and the MAC table MT2 of the Layer 2 switch SW2.

FIG. 4 illustrates a state in which entries regarding the MAC address a are deleted from the MAC table MT1 of the Layer 2 switch SW1 and the MAC table MT2 of the Layer 2 switch SW2 as a result of aging processing of the MAC table. Since entries regarding the MAC address "a" are not found in the MAC table MT2, frames transferred to the data center from the ww branch by way of the head office flood in the Layer 2 switch W2.

Referring to FIG. 5, a process for deleting entries regarding the MAC address a on the network in FIG. 3 is described.

RT1a to RT1c denote a routing table and ARP table used in the router R-d, and suffixes a to c denote detailed data stored in the routing table and ARP table, which are changed over time, at a corresponding time.

The ARP table is a table storing combinations of IP address of a router as a packet destination and MAC address of the router. In the examples denoted by RT1a to RT1c, a MAC address of a router including a routing table storing an IP address in the next hop field is stored in the ARP field of the ARP table. For ease of explanation, in FIG. 5, the routing table and the ARP table are illustrated in an integral form. The same applies to the following description about the ARP table in FIGS. 14 and 21.

RT3a and RT3b denote a routing table and ARP table used in the router R-b, and suffixes "a" and "b" denote detailed data stored in the routing table and ARP table, which are changed over time, at a corresponding time.

RT4a and RT4b denote a routing table and ARP table used in the router R-a, and suffixes "a" and "b" denote detailed data stored in the routing table and ARP table, which are changed over time, at a corresponding time.

MT1a and MT1b denote a MAC table used in the Layer 2 switch SW1, and suffixes "a" and "b" denote detailed data stored in the MAC table, which is changed over time, at a corresponding time.

MT2a and MT2b denote a MAC table used in the Layer 2 switch SW2, and suffixes "a" and "b" denote detailed data stored in the MAC table, which is changed over time, at a corresponding time.

MT3a and MT3b denote a MAC table used in the Layer 2 switch SW3, and suffixes "a" and "b" denote detailed data stored in the MAC table, which is changed over time, at a corresponding time.

MT4a and MT4b denote a MAC table used in the Layer 2 switch SW4, and suffixes "a" and "b" denote detailed data stored in the MAC table, which is changed over time, at a corresponding time.

In the case where a terminal on the ww branch LAN starts accessing the data center, if no MAC entry regarding the router R-a of the head office LAN is stored in an ARP table denoted by reference symbol RT1a, the router R-d broadcast-transmits an ARP Request to inquire about the MAC entry regarding the router R-a in step S10. Reference numerals 101 and 102 represent a state where flooding occurs in the Layer 2 switches SW2 and SW3 on a path for forwarding Request.

When receiving the ARP Request, the router R-a sends back ARP Reply in step S11. The Layer 2 switches SW1 to SW3 on a path for forwarding ARP Reply learn a MAC address of the router R-a from the passing ARP Reply.

After that, in step S12, a frame 103 is sent from the router R-d to an IP address B1 of the data center LAN. The frame 103 has an IP address D1 of the ww branch LAN as a sender IP address, and an IP address B1 of the data center LAN as a destination IP address.

The frame 103 relayed with the router R-a of the head office LAN has the MAC address "a" of the router R-a as a destination MAC address and the MAC address "d" of the router R-d as a sender MAC address. Since the Layer 2 switch SW2 on the forwarding path has learned the MAC address "a" at this time point, flooding does not occur.

The router R-a having received a packet 103 sends a frame 104 obtained by replacing the sender MAC address and destination MAC address of the frame 103 by the MAC address "a" of the router R-a and the MAC address "b" of the router R-b, respectively, toward the router R-b.

The router R-b having received a packet 104 directly sends to the router R-a, a frame 105 as a response to the frame 103 in step S13. The frame 105 has an IP address B1 of the data center LAN as a destination IP address and an IP address D1 of the ww branch LAN as a destination IP address. Further, the frame 105 has the MAC address "b" of the router R-b as a sender MAC address and the MAC address "d" of the router R-d as a destination MAC address.

As described above, in the traffic passing through the asymmetric outward and return IP paths between the ww branch and the data center, a frame sent from the data center toward the ww branch does not have the MAC address "a" of the head office router R-a used to forward the frame in the traffic to the data center from the ww branch, as a sender address. Therefore, entries regarding the MAC address a of the head office router R-a are deleted due to aging processing of the MAC table at the Layer 2 switch SW2 through which traffic passes between the ww branch and the data center.

In general, the aging processing of the MAC table in the Layer 2 switch takes about 5 minutes, and the aging processing of the ARP table in the router takes about several tens of minutes to several hours. In other words, an aging period for the MAC table is generally longer than an aging period for the ARP table.

As a result, as indicated by reference symbol MT2b, during a period from when entries regarding the MAC address a of the head office router R-a are deleted from the MAC table of the SZW2 due to aging until when the MAC address "a" is deleted from the ARP table of the router R-d, frames sent from the ww branch toward the data center flood in the Layer 2 switch SW2 in step S14 as indicated by reference numeral 106.

Such a situation not only causes unnecessary flooding but also causes a substantially incommunicable state due to an occupied band.

A network configuration that would cause flooding due to failed MAC learning is conceivable besides the network configuration in FIG. 3. FIG. 6 illustrates a second example of the network that would cause flooding due to failed MAC learning.

A terminal 110 includes two network interfaces for a wired network and a wireless network. The wired-network interface has a MAC address "a" and the wireless-network interface has a MAC address "b".

Then, an up frame is transferred to a router 113 by way of a wireless access point 111 and a Layer 2 switch 112, and a down frame is transferred to the terminal 110 by way of a Layer 2 switch 114.

With such a network configuration, the wired-network MAC address "a" of the terminal 110 fails to be learned as in the network illustrated in FIG. 3. As a result, flooding occurs in the Layer 2 switch 114.

FIG. 7 illustrates a third example of the network that would cause flooding due to failed MAC learning. In the network configuration illustrated in FIG. 7, a LAN and a WAN are connected together by a master router 120 and a backup router 121 duplexed using a virtual router redundancy protocol (VRRP: Virtual Router Redundancy Protocol) or the like.

In some cases, although a current path is switched to a path running through the backup router 121 is selected as a down path from the WAN to the LAN, a path running though the master router 120 is still selected as an up path from the LAN to the WAN. In this state, a MAC address a of a terminal 125 fails to be learned in a Layer 2 switch 126 not relaying any data between the master router 120 and the terminal as in the network of FIG. 3. As a result, flooding occurs in the Layer 2 switch 125.

FIG. 8 illustrates a fourth example of the network that would cause flooding due to failed MAC learning. In the network configuration illustrated in FIG. 8, a destination where a terminal 131 sends a frame differs from a sender that sends the received frame. This configuration example illustrates a network that provides a video distributing service. The destination is a management server that accepts a request from a terminal 131, and the sender for delivering video data is a distribution server. With this configuration, a MAC address "a" of the terminal 131 failed to be learned in a Layer 2 switch not relaying data between the management server and the terminal 131 in the network as in the network of FIG. 3. As a result, flooding occurs in the Layer 2 switch 131.

In view of the above circumstances, the device, system, computer program, and method disclosed herein relate to a frame switching device for changing frames in a frame switching network. In the device that stores an output port for outputting a frame having a corresponding address as a destination address in association with each of addresses, and executes flooding processing at the time of transferring a frame having a destination address not stored in association with an output destination port, it is intended to suppress flooding that would occur if a destination address has not been stored.

SUMMARY

According to an aspect of the invention, a frame switching device for switching frames in a frame switching network, the frame switching device connecting with other frame switching device via the frame switching network, the frame switching device includes: a plurality of ports connecting with other frame switching devices in the frame switching network, respectively, the plurality of ports sending a sending frame and receiving a receiving frame; an address entry memory for storing an address entry indicating relationship between an address and the port receiving the frame including the address as a sender address; a flooding processor for executing flooding process of the sending frame when the address entry related to the sender address of the sending frame is absence in the address entry memory; a flooding determination unit for determining whether the flooding occurrence for the address satisfies a predetermined condition; a notification transmitting unit for transmitting a searching frame when the flooding determination unit determines to satisfy a predetermined condition; a notification receiving unit for receiving a predetermined notification for the address entry related to the address in flooding occurrence from the other frame switching device via the frame switching network; and an address entry registration unit for registering the address entry in the address entry memory, the address entry being associated with the address in satisfying the predetermined condition by the flooding determining unit and the port receiving the predetermined notification.

The object and advantages of the invention will be realized and attained by means of the elements and combinations particularly pointed out in the claims. It is to be understood that both the foregoing general description and the following detailed description are exemplary and explanatory and are not restrictive of the invention, as claimed.

BRIEF DESCRIPTION OF DRAWINGS

FIG. 10 illustrates a data structure example of a MAC table.

FIG. 11 illustrates a data structure example of a port setting table.

FIG. 13 illustrates a format example of a MAC entry searching frame and a MAC entry notification frame.

FIG. 15 is a flowchart illustrating a first example of processing for determining whether flooding satisfies a predetermined condition.

FIG. 16 illustrates a first example of the data structure of a failed-learning flag table.

FIG. 17 is a flowchart illustrating a second example of processing for determining whether flooding satisfies a predetermined condition.

FIG. 18 illustrates a second example of the data structure of a failed-learning flag table.

FIG. 25 illustrates a first example of the data structure of a deleted-address table.

FIG. 27 illustrates a second example of the data structure of a deleted-address table.

DESCRIPTION OF EMBODIMENTS

Figure 9:
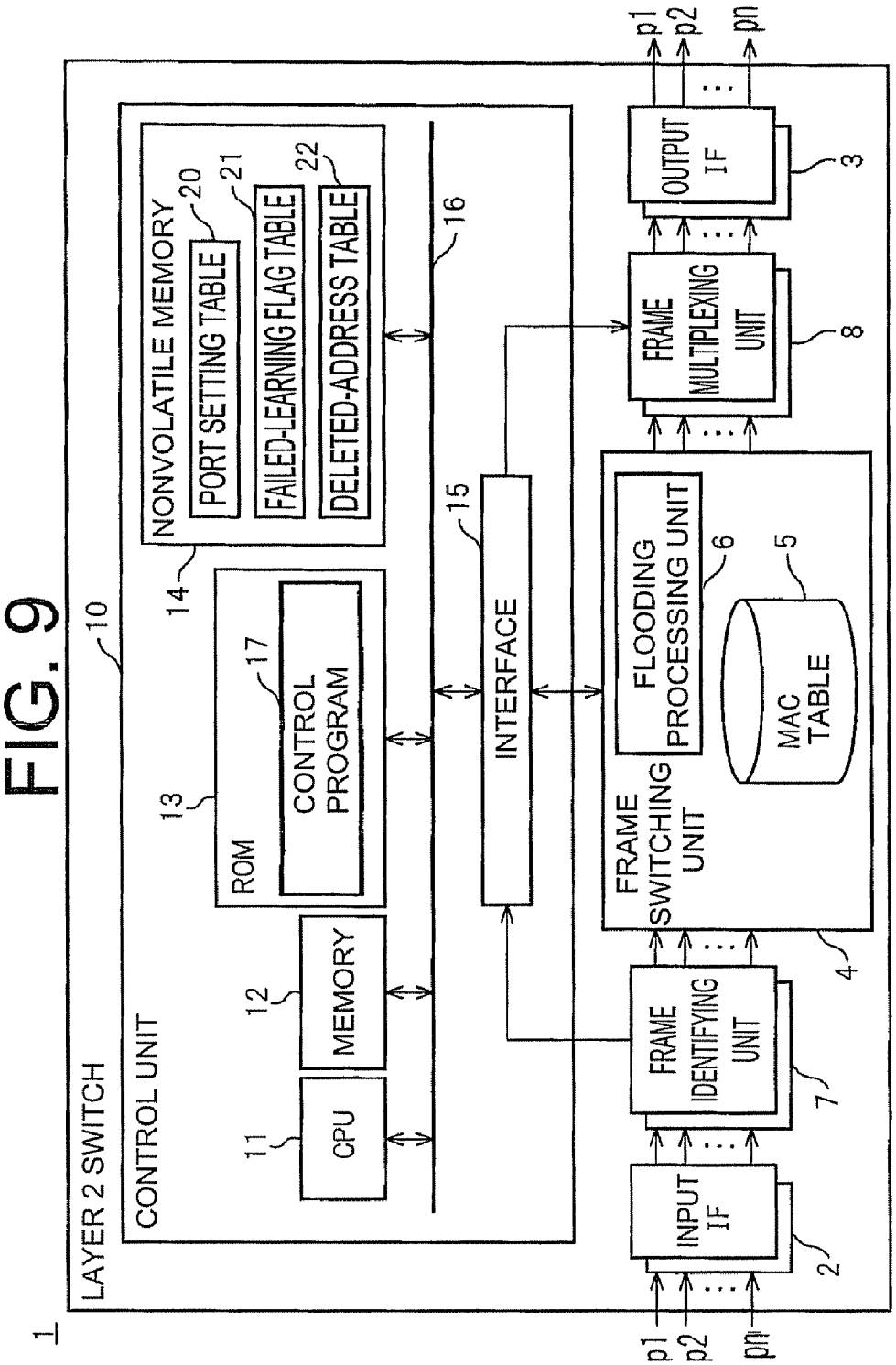
FIG. 9 is a diagram illustrating hardware configuration of a Layer 2 switch as an embodiment of a frame switching device disclosed herein.

Hereinafter, embodiments will be described with reference to the accompanying drawings. FIG. 9 is a diagram illustrating hardware configuration as an embodiment of a frame switching device disclosed herein. In this specification, a description is given of the frame switching device disclosed herein based on an example of an Ethernet (registered trademark) switch or other such Layer 2 switches. However, a scope of the frame switching device disclosed herein should not be limited to the Layer 2 switch.

The frame switching device disclosed herein can be widely applied to switching devices that store address entries indicating a correspondence relationship between an address and an output port for outputting a frame addressed to the address as well as performs flooding processing on a frame addressed to an address not included in the stored address entries.

A layer 2 switch 1 includes plural ports p1, p2, ..., and pn for transmitting receiving a MAC frame, an input interface 2 connected to the ports p1, p2, ..., and pn, an output interface 3 connected to the ports p1, p2, ..., and pn, and a frame switching unit 4 that connects/disconnects the input interface 2 and output interface 3 connected to each of the ports p1, p2, ..., and pn to thereby switch frames input/output to/from the ports p1, p2, ..., and pn.

The frame switching unit 4 is equipped with a MAC table 5 and determines a port for outputting a target MAC frame for forwarding in accordance with combinations of destination MAC addresses and destination ports, which are stored in the MAC table 5.

FIG. 10 illustrates an example of data structure of the MAC table 7. The MAC table 5 includes at least a MAC field storing a destination MAC address of a MAC frame to be forwarded and a PORT field storing an identifier of a port used to transmit a MAC frame to be forwarded. In the table, a frame having ports for outputting a frame having a corresponding destination MAC address are stored in association therewith.

Data including a combination of destination MAC address and output destination port stored in the MAC table 5, in other words, a combination of data stored in each record of the MAC table 5 is referred to as MAC entry. The MAC entry corresponds to an address entry described in the scope of claims.

The frame switching unit 4 includes a flooding processor 6. If no MAC entry regarding a destination MAC address of a MAC frame to be transferred is stored in the MAC table 5, the flooding processor 6 carries out flooding processing on the MAC frame. In other words, the flooding processor 6 outputs the MAC frame from all ports but the frame-received port.

Referring back to FIG. 9, the Layer 2 switch 1 includes a controller 10 that executes spanning tree processing or each processing described below in this specification, a frame identifying unit 7 for identifying a control frame used for processing of the controller 10 among received MAC frames and sending the frame to the controller 10, and a frame multiplexing unit 8 for multiplexing a control frame output from the controller 10 on a frame output from the frame switching unit 4 so as to output the control frame to the ports p1, p2, ..., and pn.

The controller 10 includes a CPU 11, a memory 12, a ROM 13, a nonvolatile memory 14, and an interface 15. The components 11 to 15 are connected together via a data bus and a control bus 16.

The ROM 13 stores a control program 17 that is executed by the CPU 11 and prompts the CPU 11 to execute the following processing. The control program 17 corresponds to a computer program described in the scope of claims.

In this embodiment, the control program 17 prompts the CPU 11 to execute processing including spanning tree processing, but this processing is not indispensable one of the computer program disclosed herein.

The memory 12 is used as a temporary data storage area of the CPU 11 using to execute the control program 17.

The nonvolatile memory 14 stores a port setting table 20, a failed-learning flag table 21, and a deleted-address table 22.

FIG. 11 illustrates a data structure example of the port setting table 20. The port setting table 20 stores configuration information about the ports p1, p2, ..., and pn, which is set by a user in accordance with the network configuration where the Layer 2 switch is used. In the FIG. 11 illustrated example, the port setting table 20 includes at least a port field storing an identifier of each port and a network identification field storing an identifier for identifying a type of a network to be connected to each port.

The network identification field stores data about whether a network to be connected to a target port is a LAN, in other words, whether the target port is connected to a terminal, a router, or the like, or whether the target port configures a Layer 2 network.

In the following description, the port connected to a LAN, that is, a port connected to a terminal, a router, or the like is also referred to as "LAN-side port", and the port configuring a Layer 2 network is also referred to as "WAN-side port".

The data structures of the failed-learning flag table 21 and the deleted-address table 22 will be described later.

Referring back to FIG. 9, an interface 15 transmits/receives signals to/from the controller 10, the frame switching unit 4, the MAC table 7, or the frame multiplexing unit 8.

Figure 12:
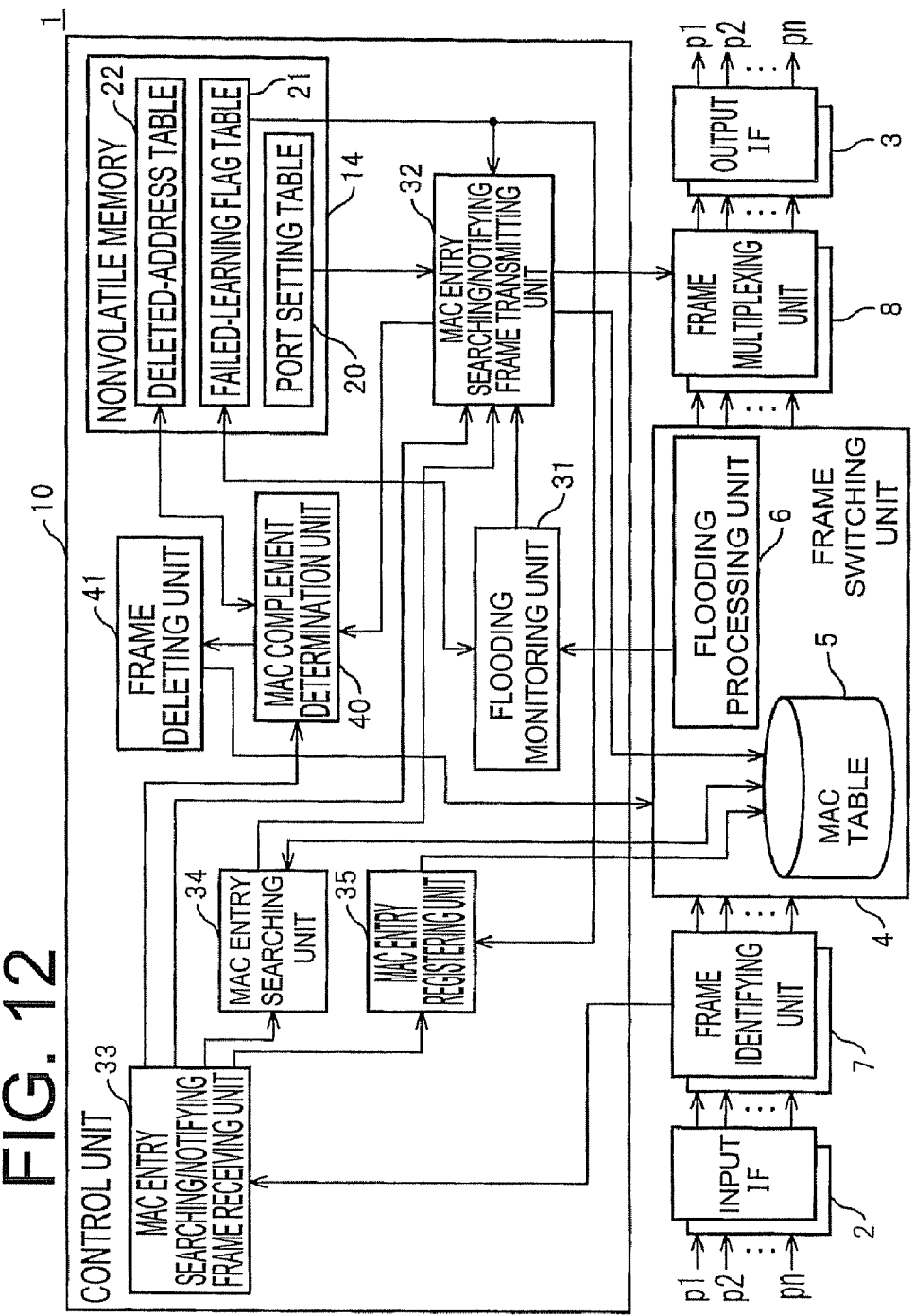
FIG. 12 illustrates functional blocks implemented by a CPU executing a control program stored in a ROM in FIG. 9.

In this embodiment, the controller 10 illustrated in FIG. 9 is implemented by software processing of the CPU 11. In addition, functions of functional blocks 31 to 35, 40, and 41 described below in FIG. 12 are executed in the CPU 11. However, the controller 10 may be implemented using a special hardware circuit. In addition, any special hardware circuit may be used to implement each of functional blocks 31 to 35, 40, and 41 described below with reference to FIG. 12.

FIG. 12 illustrates functional blocks implemented by the CPU 11 executing the control program 17 stored in the ROM 13 in FIG. 9. By executing the control program 17, the CPU 11 operates as a flooding monitoring unit 31, a MAC entry searching/notifying frame transmitting unit 32, a MAC entry searching/notifying frame receiving unit 33, a MAC entry searching unit 34, a MAC entry registering unit 35, a MAC complement determination unit 40, and a frame deleting unit 41.

Here, the flooding monitoring unit 31 corresponds to a flooding determination unit described in the scope of claims, the MAC entry searching/notifying frame receiving unit 33 corresponds to a notification receiving unit described in the scope of claims, and the MAC entry registering unit 35 corresponds to an address entry registration unit described in the scope of claims.

Further, the MAC entry searching/notifying frame transmitting unit 32 corresponds to a notification transmitting unit described in the scope of claims, and the MAC complement determination unit 40 corresponds to a registration permission/rejection determination unit described in the scope of claims.

The flooding monitoring unit 31 monitors flooding processing executed by the flooding processor, and examines each MAC address that caused flooding by determining whether the flooding that occurred at each of the MAC addresses satisfies a predetermined condition. The predetermined condition and the determination processing performed by the flooding monitoring unit 31 are described later.

If the flooding monitoring unit 31 determines that flooding having occurred at any MAC address satisfies a predetermined condition, the MAC entry searching/notifying frame transmitting unit 32 generates a MAC entry searching frame for the MAC address and broadcast-transmits the frame to any other Layer 2 switch on a Layer 2 network to which the Layer 2 switch belongs.

The MAC entry searching frame is a control frame for inquiring of the other Layer 2 switch as to whether the MAC table 5 stores a MAC entry regarding the same MAC address as the MAC address that caused flooding determined to satisfy a predetermined condition by the flooding monitoring unit 31.

The MAC entry searching/notifying frame transmitting unit 32 generates; a MAC entry notification frame notifying that the MAC table 5 stores a MAC entry, regarding any MAC address, and broadcast-transmits the frame to the other layer 2 switch on the Layer 2 network to which the Layer 2 switch 1 belongs. The MAC entry notification frame corresponds to a predetermined notification described in the scope of claims.

The MAC entry searching frame and the MAC entry notification frame may have either a similar format to a control frame for exchanging a message between adjacent switches, which is used by, for example, a spanning tree protocol or the like, or a packet format set on a TCP/IP stack.

FIG. 13 illustrates a format example of the MAC entry searching frame and the MAC entry notification frame. The MAC entry searching frame and the MAC entry notification frame include a DA field, an SA field, an Ether_type field, a Version field, an ID field, a Type field, and a MAC entry field.

The DA field stores a destination MAC address of a frame. The destination MAC address may be a multicast address used for a Layer 2 switch control frame, for example, "01-80-C2-00-00-0X".

The last digit "X" varies depending on a type of processing in which a control frame is used. This value is specially assigned to the following processing disclosed in this specification.

The SA field stores a sender MAC address of a frame.

The Ether_type field stores a 2-byte code for identifying whether a frame is a control frame used for the following processing disclosed in this specification.

The ID field stores an identifier of a Layer 2 switch that generates a MAC entry searching frame and a MAC entry notifying frame, more specifically, an identifier of a Layer 2 switch that first transmits the frame. Any identifier capable of identifying each switch on the Layer 2 network can be used. A MAC address may be used.

The Type field stores type information representing whether a frame is a MAC entry searching frame or a MAC entry notifying frame. In this embodiment, the Type field of the MAC entry searching frame stores "Req", and the Type field of the MAC entry notifying frame stores "Reply".

The MAC entry field of the MAC entry searching frame stores such a MAC address that any other Layer 2 switch is inquired about whether the address is stored in the MAC table 5.

The MAC entry field of the MAC entry notifying frame stores a MAC address the Layer 2 switch stores in the MAC table 5.

As described below, if the MAC entry notifying frame is transmitted in response to the MAC entry searching frame, the MAC entry field of the MAC entry notifying frame stores a MAC address inquired by the MAC entry searching frame.

If the MAC entry searching unit 34 described below finds, in the MAC table 5, a MAC entry regarding the MAC address inquired by the MAC entry searching frame received by the MAC entry searching/notifying frame receiving unit 33 described below, the MAC entry searching/notifying frame transmitting unit 32 generates a MAC entry notifying frame that notifies that the inquired MAC address is stored in the MAC table 5 and transmits the frame from a port that received the MAC entry searching frame.

Referring back to FIG. 12, the MAC entry searching/notifying frame receiving unit 33 receives the MAC entry searching frame and MAC entry notifying frame sent from any other Layer 2 switch.

The MAC entry searching unit 34 searches the MAC table 5 for a MAC entry regarding the MAC address inquired by the MAC entry searching frame received by the MAC entry searching/notifying frame receiving unit 33.

If the flooding monitoring unit 31 determines to satisfy a predetermined condition in the flooding occurrence at a MAC address notified by the MC entry notifying frame received by the MAC entry searching/notifying frame receiving unit 33, the MAC entry registering unit 35 registers a MAC entry including a pair of a port that received the MAC entry notifying frame and the MC address in the MAC table 5.

The MAC complement determination unit 40 determines whether the MAC entry registering unit 35 successfully registers the MAC entry regarding the MAC address that caused flooding determined to satisfy the predetermined condition with the flooding determination unit 6.

The frame deleting unit 41 outputs to the frame switching unit 4, an instruction signal that instructs the frame switching unit 4 to delete a frame having a MAC address the MAC entry registering unit 35 could not register, as a destination MAC address.

Figure 14:
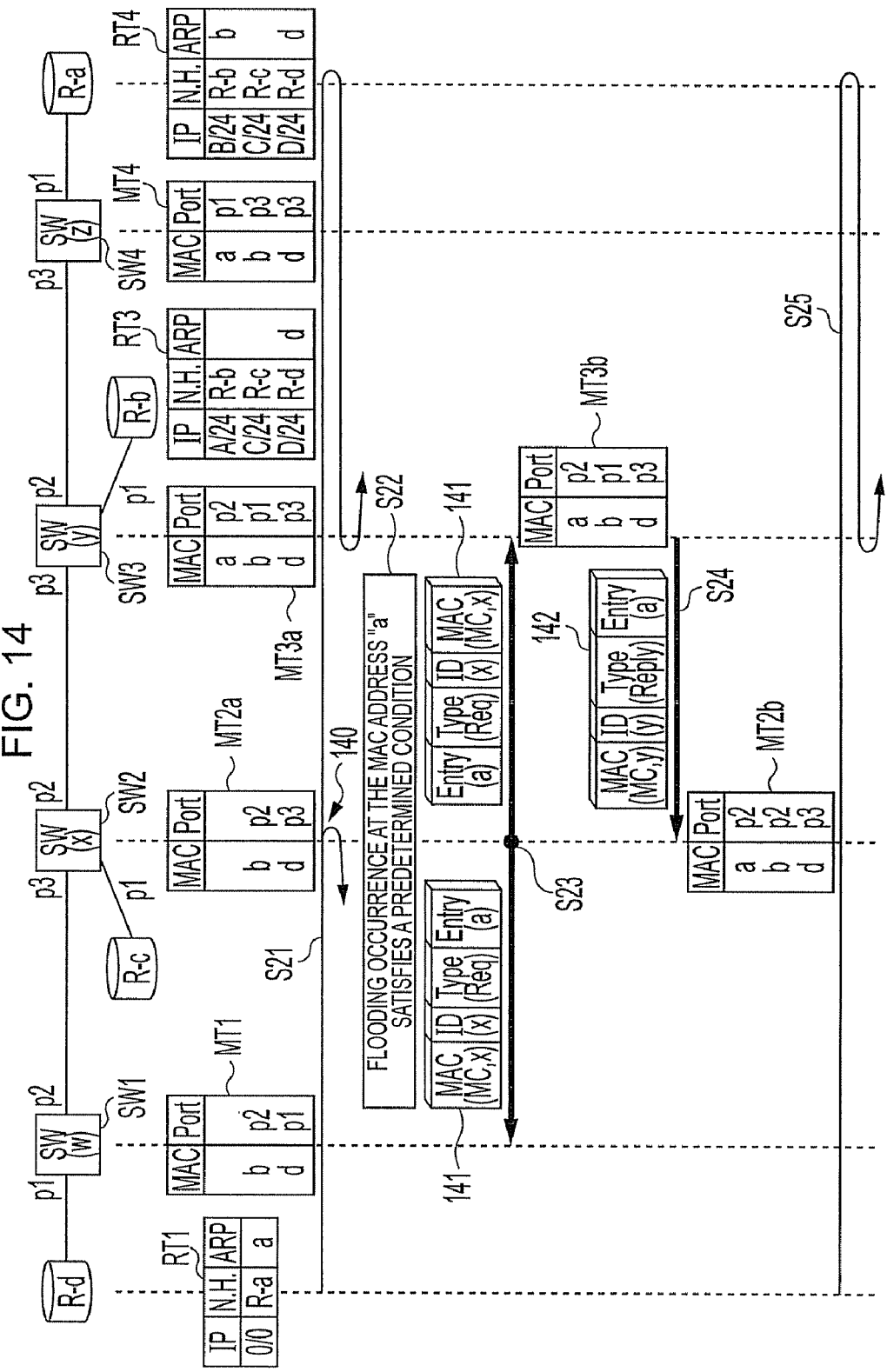
FIG. 14 is a sequence diagram illustrating a first operational example of the frame switching device disclosed herein.

FIG. 14 is a sequence diagram illustrating a first operational example of the frame switching device 1 disclosed herein.

Figure 1A:
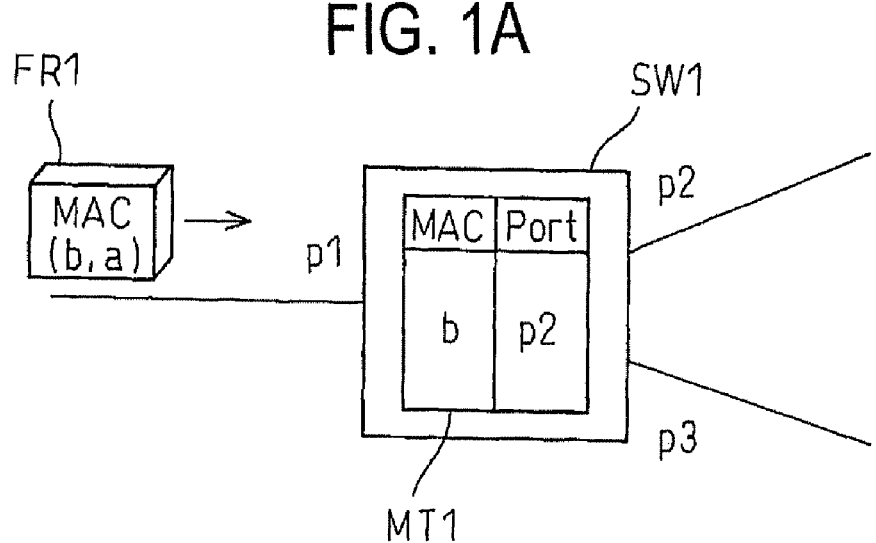
FIGS. 1A and 1B illustrate a conventional MAC learning method.
Figure 1B:
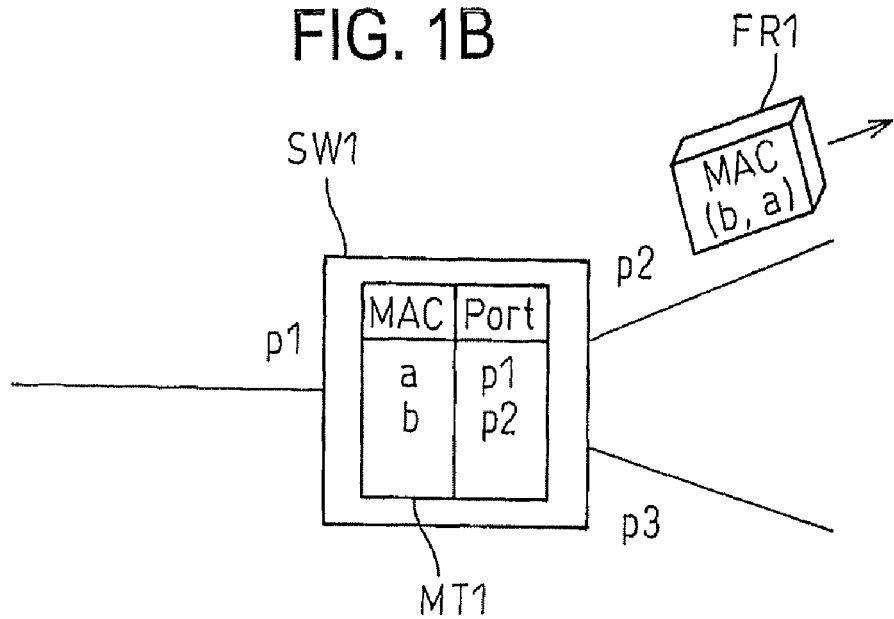
Figure 2A:
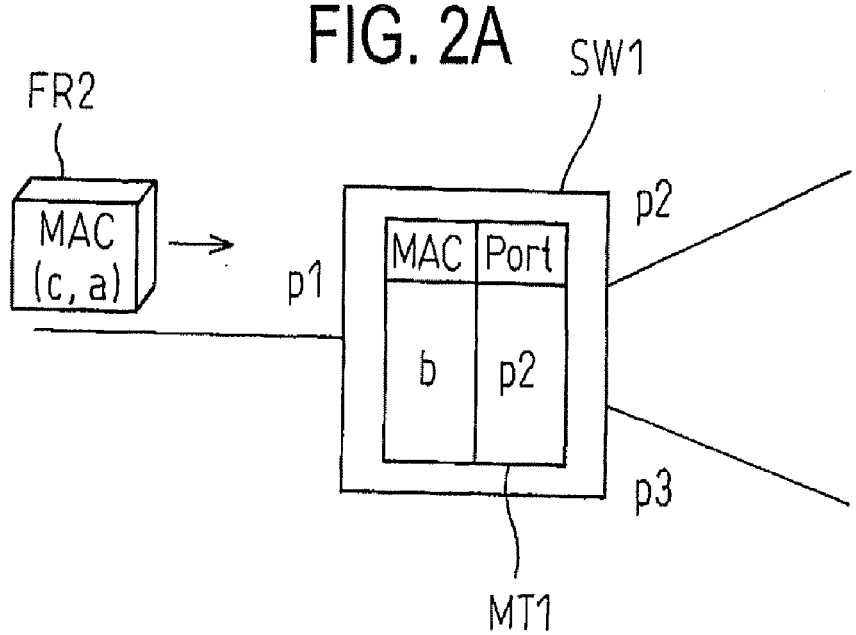
FIGS. 2A and 2B illustrate flooding processing in the case where a destination MAC address has not been learned.
Figure 2B:
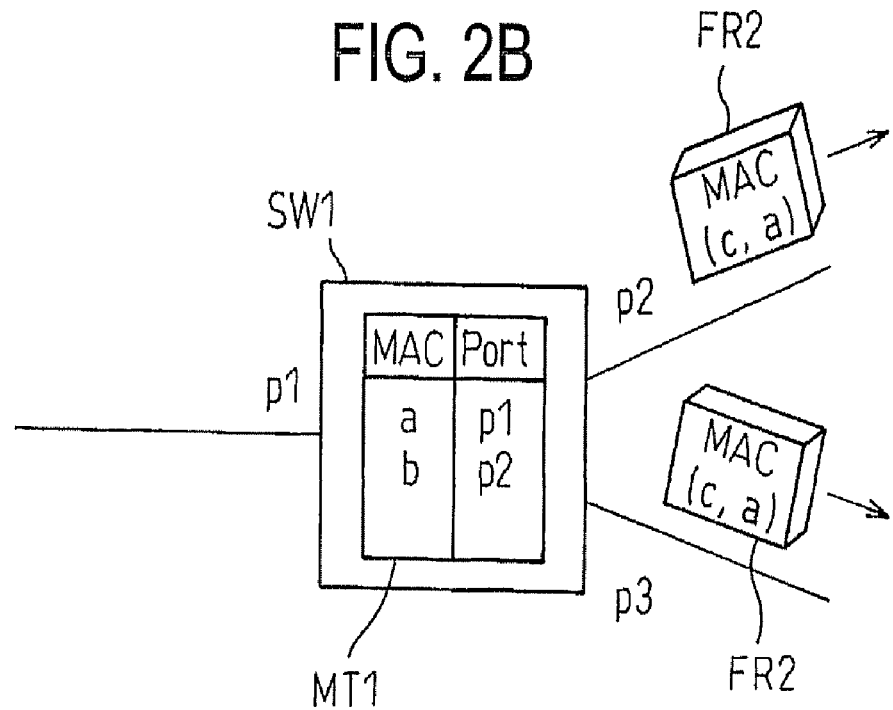
Figure 3:
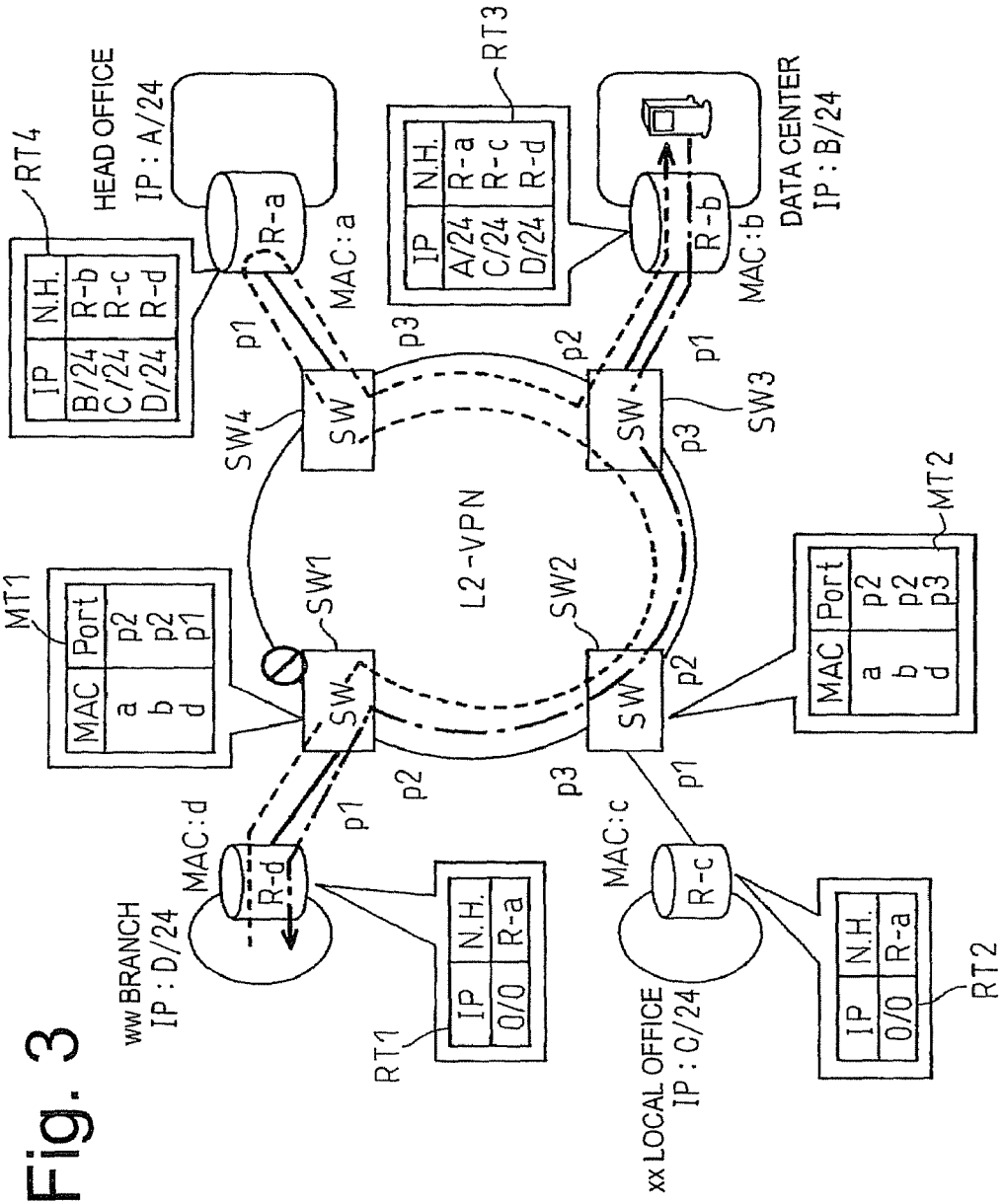
FIG. 3 illustrates a first example of a network that would cause flooding due to failed MAC learning.
Figure 6:
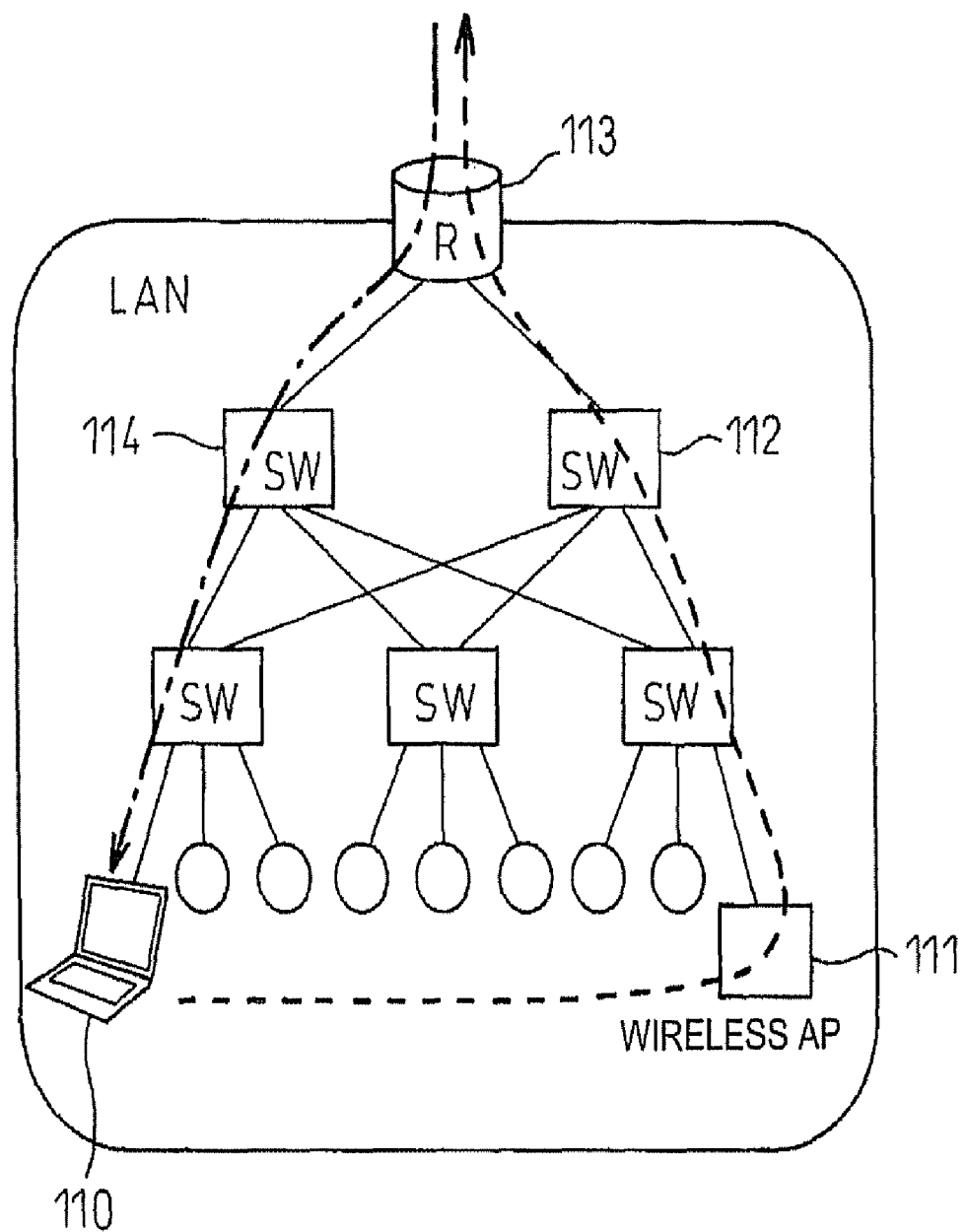
FIG. 6 illustrates a second example of a network that would cause flooding due to failed MAC learning.
Figure 7:
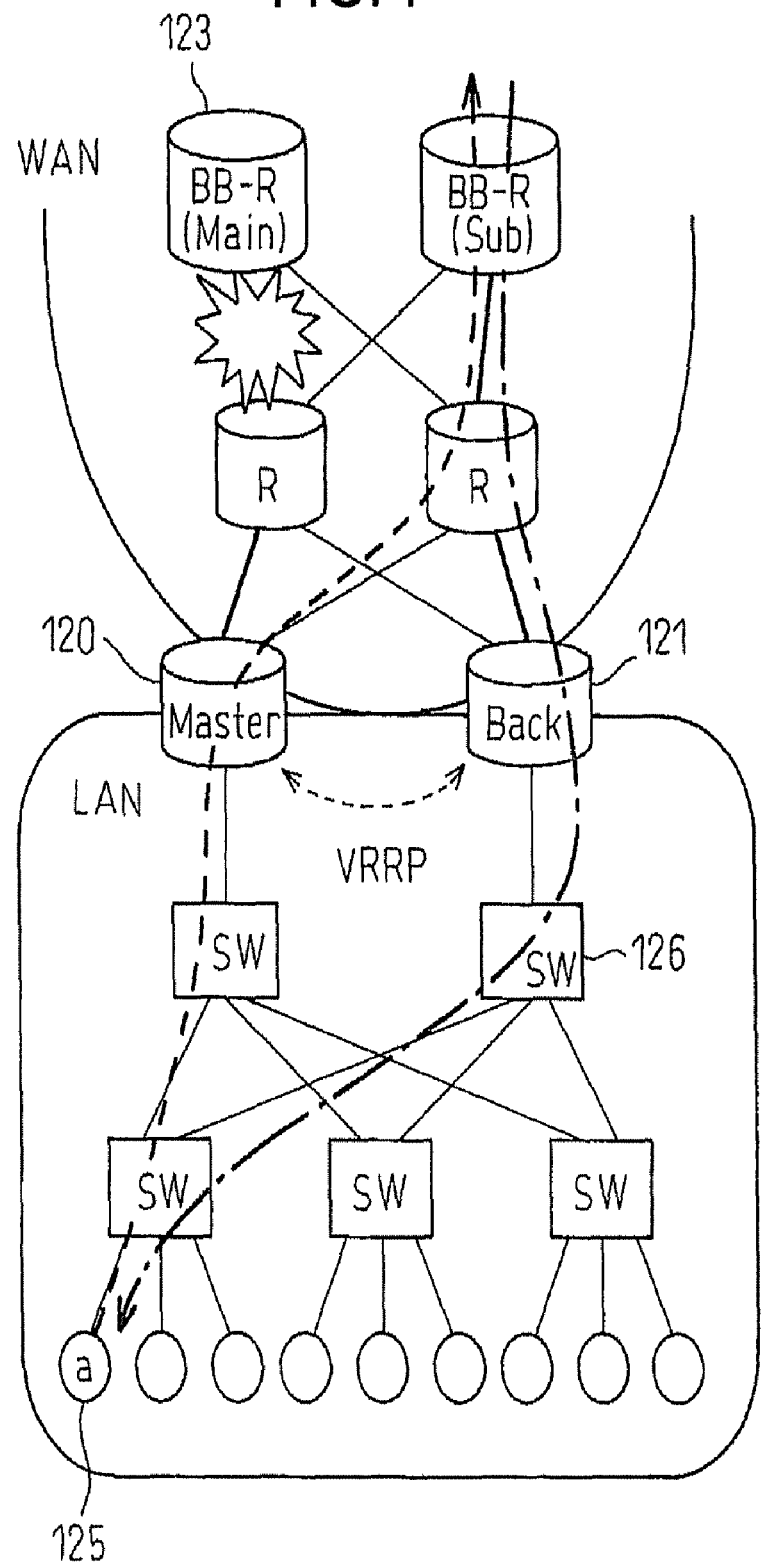
FIG. 7 illustrates a third example of a network that would cause flooding due to failed MAC learning.
Figure 8:
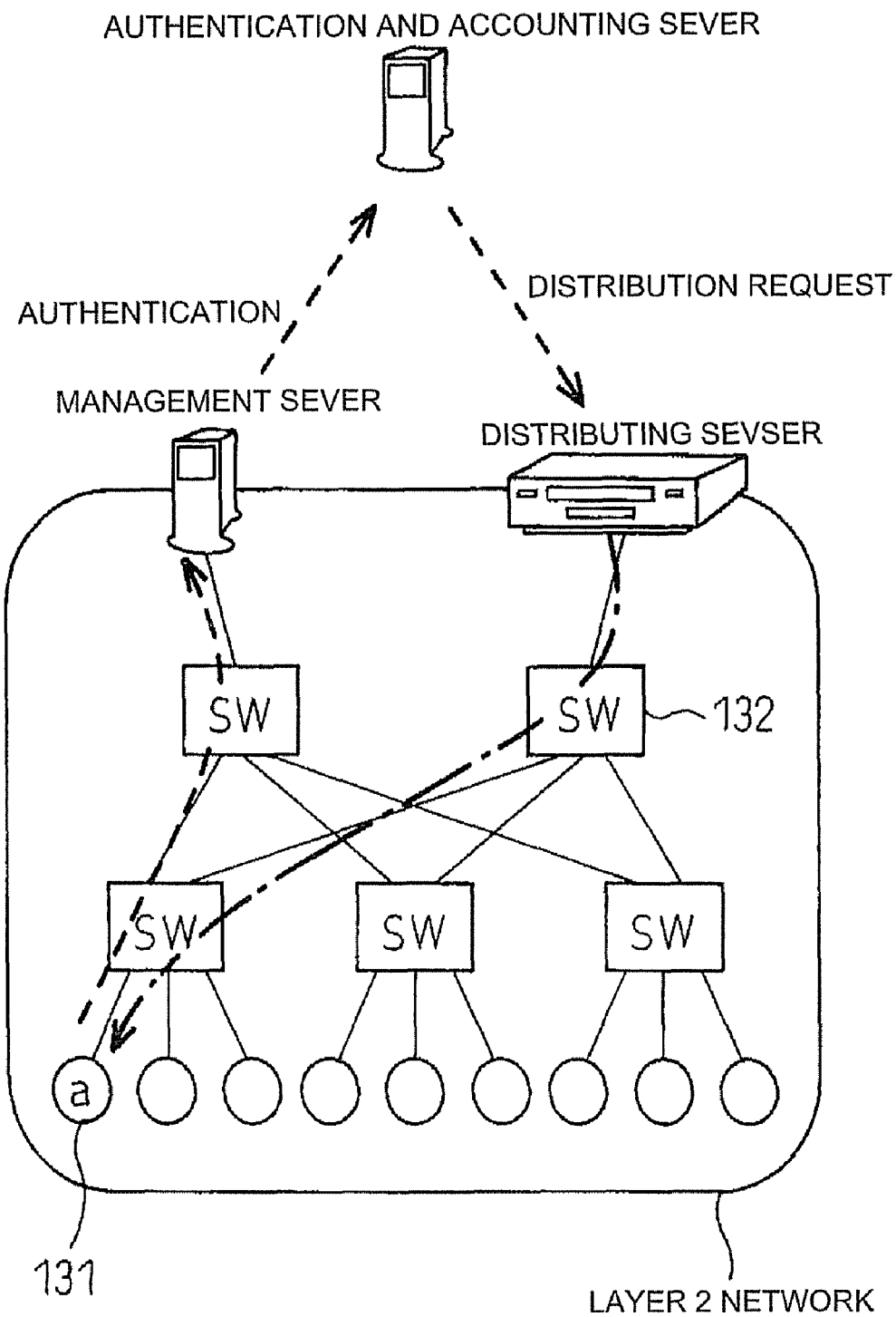
FIG. 8 illustrates a fourth example of a network that would cause flooding due to failed MAC learning.

The following description is given of an operation of the Layer 2 switch 1 in the case of using the Layer 2 switch 1 illustrated in FIG. 9 on the assumption that Layer 2 switches SW1 to SW4 in the network configuration of FIG. 3 are used. However, the Layer 2 switch 1 disclosed herein can attain the following functions as well as achieve the following advantages even if applied to another network configuration, for example, each network configuration described with reference to FIGS. 6 to 8. The same applies to an example of FIG. 21.

Further, in the following description, MAC addresses the Layer 2 switches SW1, SW2, SW3, and SW4 are represented by w, x, y, and z, respectively.

RT1 RT3, and RT4 represent a routing table and an ARP table used in routers R-d, R-b, and R-a, respectively.

MT1 and MT4 represent MAC tables used in the Layer 2 switch SW1 and the Layer 2 switch SW4, respectively.

MT2$a$ and MT2$b$ represent MAC tables used in the Layer 2 switch SW2, and suffixes a and b denote detailed data stored in the MAC table, which is changed over time, at a corresponding time.

MT3$a$ and MT3$b$ represent MAC tables used in the Layer 2 switch SW3, and suffixes "a" and "b" denote detailed data stored in the MAC table, which is changed over time, at a corresponding time.

Figure 4:
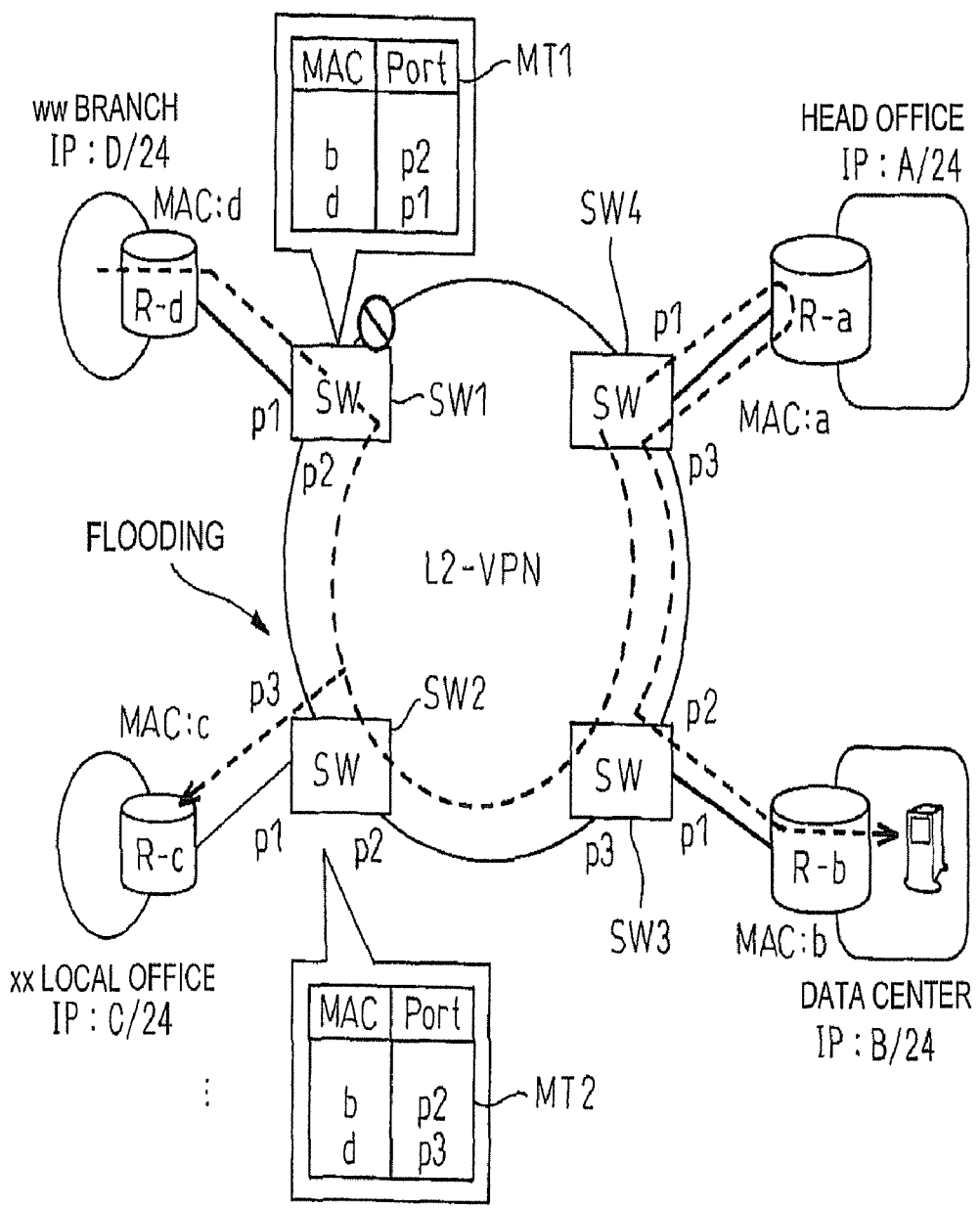
FIG. 4 illustrates a state where flooding occurs on the network in FIG. 3.
Figure 5:
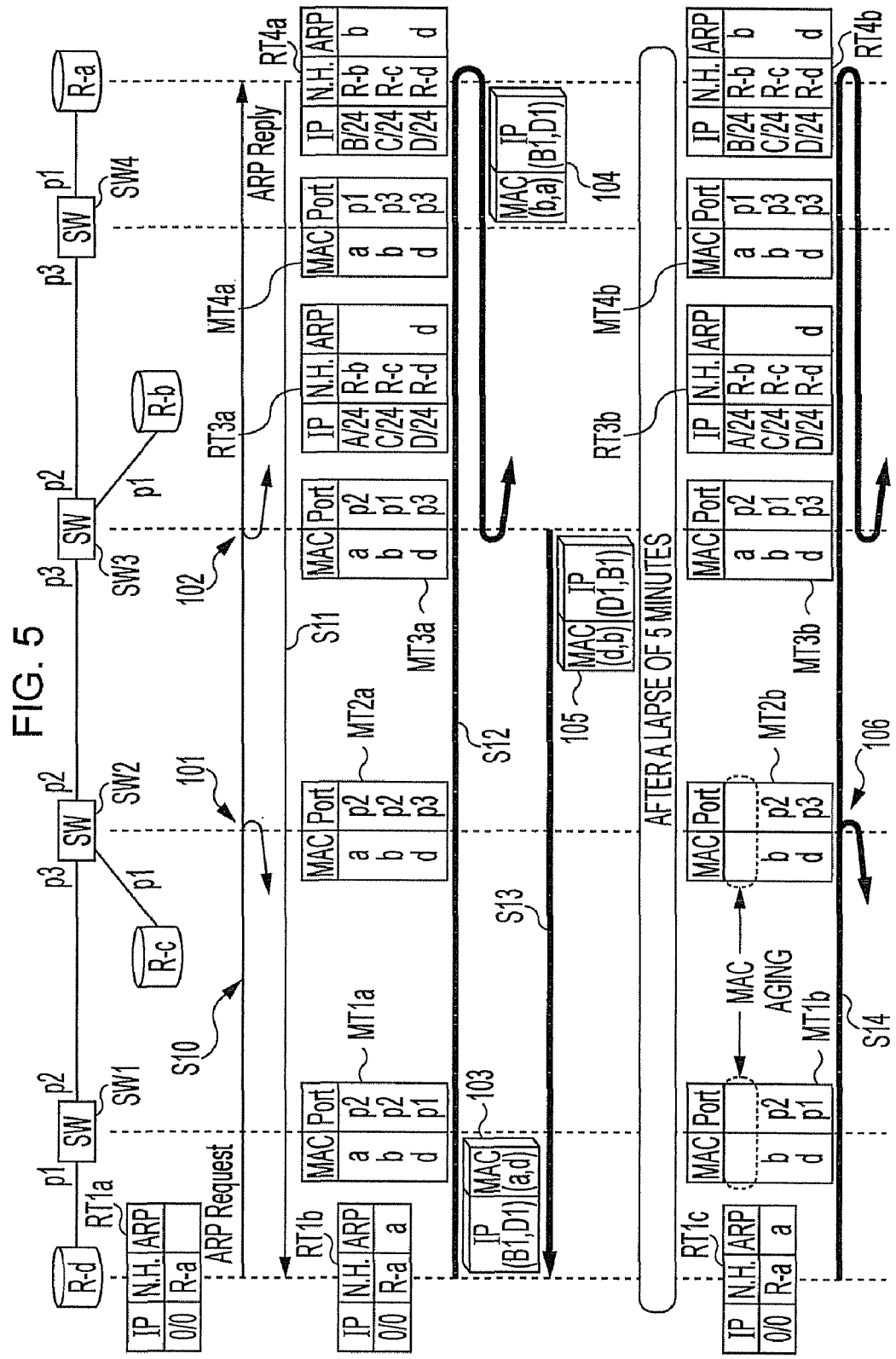
FIG. 5 illustrates a process in which flooding occurs on the network in FIG. 3.

In step S21, a frame is transmitted from the router R-d on the ww branch LAN to the data center. As described above with reference to FIGS. 3 to 5, a destination MAC address of the frame is a MAC address "a" of the router R-a on the head office LAN. In the illustrated example, since the MAC table MT2$a$ of the Layer 2 switch SW2 does not store a MAC entry regarding the address "a", flooding occurs in the Layer 2 switch SW2 as indicated by reference numeral 140.

The flooding monitoring unit 31 illustrated in FIG. 12 performs processing for determining whether flooding caused in the Layer 2 switch SW2 satisfies a predetermined condition.

FIG. 15 is a flowchart illustrating a first example of processing for determining whether flooding satisfies a predetermined condition. In this example, if the number of occurrences of flooding is equal to or larger than a predetermined threshold value Tc, it is determined that flooding satisfies a predetermined condition.

In step S30, the flooding monitoring unit 31 detects whether the flooding processor 6 of FIG. 12 performed flooding processing. If no flooding processing was performed, step S30 is repeated.

If it is determined in step S30 that the flooding processor 6 performed flooding, the flooding monitoring unit 31 increments, by 1, the number of occurrences of flooding in relation to a MAC address determined to cause flooding in step S30, among the numbers of occurrences of flooding stored in association with each MAC address in the failed-learning flag table 21 stored in the nonvolatile memory of FIG. 12 in step S31.

FIG. 16 illustrates a first example of the data structure of the failed-learning flag table 21. The failed-learning flag table 21 has a MAC field storing a MAC address that caused flooding, a flooding number field storing the number of occurrences of flooding at each MAC address, and a result check flag field storing a result check flag indicating whether the number of occurrences of flooding at each MAC address is equal to or larger than a threshold value Tc. The result check flag set to a value "0" indicates that the number of occurrences of flooding is smaller than the threshold value Tc. The flag set to a value "1" indicates that number of occurrences of flooding is equal to or larger than the threshold value Tc.

In step S32 in FIG. 15, the flooding monitoring unit 31 determines whether the number of occurrences of flooding in relation to the MAC address determined to cause flooding in step S30, which is stored in the failed-learning flag table 21, is equal to or larger than the predetermined threshold value Tc. If the number of occurrences of flooding is smaller than the threshold value Tc, the flooding monitoring unit 31 returns the processing to S30.

If it is determined in step S32 that the number of occurrences of flooding is equal to or larger than the threshold value Tc, the flooding monitoring unit 31 sets the result check flag stored in the failed-learning flag table 21 in association with the MAC address determined to cause flooding in step S30 to "1" in step S33.

FIG. 17 is a flowchart illustrating a second example of processing for determining whether flooding satisfies a predetermined condition. In this example, if flooding occurs at any address over a predetermined period, it is determined that flooding satisfies a predetermined condition.

In step S40, the flooding monitoring unit 31 detects whether the flooding processor 6 performed the flooding processing. If no flooding processing was performed, step S40 is repeated.

If it is determined in step S40 that the flooding processor 6 performed the flooding processing, the flooding monitoring unit 31 determines whether timer means for measuring an elapsed time from when flooding was detected up to a current time for each MAC address starts measuring an elapsed time as to a MAC address determined to cause flooding in step S40, in step S41.

If the timer means does not start measurement, the flooding monitoring unit 31 activates the timer means for the MAC address determined to cause flooding in step S40 in step S42 and then returns the processing to step S40.

In step S43, the flooding monitoring unit 31 references an elapsed time from when flooding was detected, which is stored in the failed-learning flag table 21 in association with the MAC address determined to cause flooding in step S40 when it is determined in step S41 that the timer means starts measurement.

FIG. 18 illustrates a second example of the data structure of the failed-learning flag table 21. The failed-learning flag table 21 has a MAC field storing a MAC address that caused flooding, a flooding period field storing an elapsed time from when flooding was detected at each MAC address up to a current time, and a result check flag indicating whether the elapsed time from when flooding was detected at each MAC address up to a current time is equal to or longer than a threshold time Tt.

The result check flag set to a value "0" indicates that the elapsed time is shorter than the threshold time Tt. The flag set to a value "1" indicates that elapsed time is equal to or longer than the threshold time Tt. Further, elapsed time information stored in the flooding period field is updated by the timer means.

The flooding monitoring unit 31 determines whether an elapsed time from when flooding was detected at the MAC address determined to cause flooding in step S40 is equal to or longer than the threshold time Tt. If the elapsed time is shorter than the threshold time Tt, the flooding monitoring unit 31 returns the processing to step S40.

In step S44, the flooding monitoring unit 31 sets the result check flag stored in the failed-learning flag table 21 in association with the MAC address determined to cause flooding in step S40 to "1" when it is determined in step S43 that the elapsed time is shorter than the threshold time Tt.

Referring back to FIG. 14, if it is determined that flooding having occurred at the MAC address "a" satisfies a predetermined condition in step S22, the flooding monitoring unit 31 of the Layer 2 switch SW2 sets the result check flag to "1", the result check flag stored in the failed-learning flag table 21 in association with the MAC address "a".

Further, the MAC entry searching/notifying frame transmitting unit 32 in the Layer 2 switch SW2 in FIG. 12 generates a MAC entry searching frame 141, and transmits the frame from the WAN side port of the Layer 2 switch SW2 in step S23 of FIG. 14.

The MAC entry searching frame 141 inquires of the other Layer 2 switches SW1, SW3, and SW4 as to whether the Layer 2 switches SW1, SW3, and SW4 store, in the MAC table, a MAC entry regarding the MAC address "a" that caused flooding determined to satisfy a predetermined condition in step S22.

An allowable range of a switch that receives the MAC entry searching frame 141 from the Layer 2 switch SW2 may be limited to the switches SW3 and SW4 adjacent to the Layer 2 switch SW2 as an inquirer. In this case, the switches SW3 and SW4 do not transfer the MAC entry searching frame 141 received from the adjacent switch SW2.

In the MAC entry searching frame 141, a destination address is a multicast address MC used in the MAC entry searching frame and MAC entry notifying frame described above with reference to FIG. 13, a sender MAC address is a MAC address x of the Layer 2 switch SW2, a value in the ID field is the MAC address x of the Layer 2 switch SW2, a value in the Type field is "Req" indicating the MAC entry searching frame, and a value in the MAC entry field is the MAC address "a".

Figure 19:
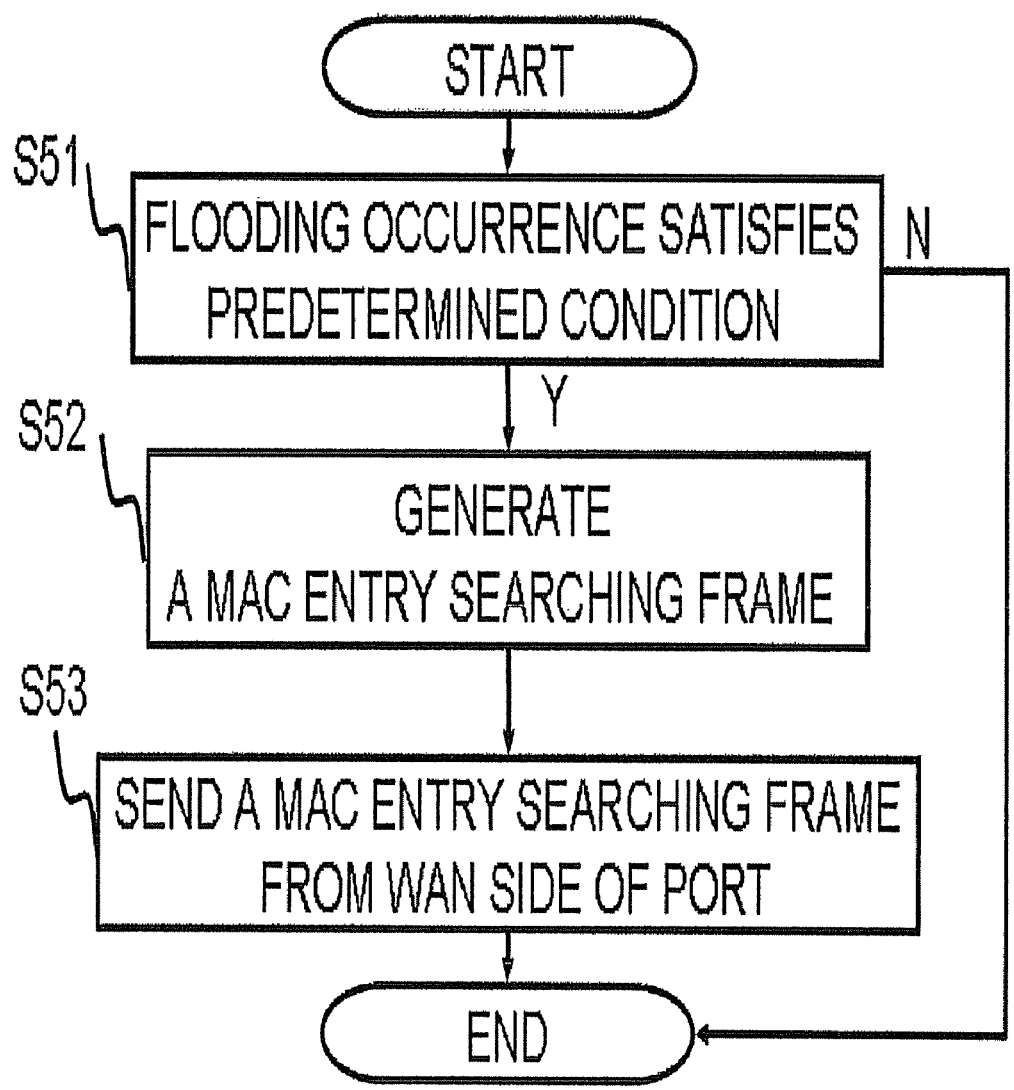
FIG. 19 is a flowchart of processing for transmitting a MAC entry searching frame.

FIG. 19 is a flowchart of processing for transmitting a MAC entry searching frame with the MAC entry searching/notifying frame transmitting unit 32.

In step S51, the MAC entry searching/notifying frame transmitting unit 32 determines whether flooding having occurred at each MAC address satisfies a predetermined condition with reference to the result check flag in the failed-learning flag table 21.

In step S52, the MAC entry searching/notifying frame transmitting unit 32 generates the MAC entry searching frame 141 for inquiring about a MAC address that caused flooding that satisfies a predetermined condition.

In step S53, the MAC entry searching/notifying frame transmitting unit 32 transmits the MAC entry searching frame 141 from a port that is determined as a WAN side port based on the port setting table 20.

Referring back to FIG. 14, the MAC table MT1 of the Layer 2 switch SW1 that received the MAC entry searching frame 141 does not store a MAC entry regarding the inquired MAC address a. Thus, the Layer 2 switch SW1 makes no reply to the MAC entry searching frame 141.

On the other hand, the MAC table MT3b of the Layer 2 switch SW3 that received the MAC entry searching frame 141 stores a MAC entry regarding the MAC address "a".

Thus, the Layer 2 switch SW3 transmits the MAC entry notifying frame 142 indicating that the MAC entry regarding the MAC address a is stored in the MAC table MT3b, from the port p2 where the MAC entry searching frame is received in step S24.

In the MAC entry notifying frame 142, a destination address is a multicast address MC used in the MAC entry searching frame and MAC entry notifying frame described above with reference to FIG. 13, a sender MAC address is a MAC address y of the Layer 2 switch SW3, a value in the ID field is the MAC address y of the Layer 2 switch SW4, a value in the Type field is "Reply" indicating the MAC entry notifying frame, and a value in the MAC entry field is the MAC address "a" inquired by the MAC entry searching frame 141.

Figure 20:
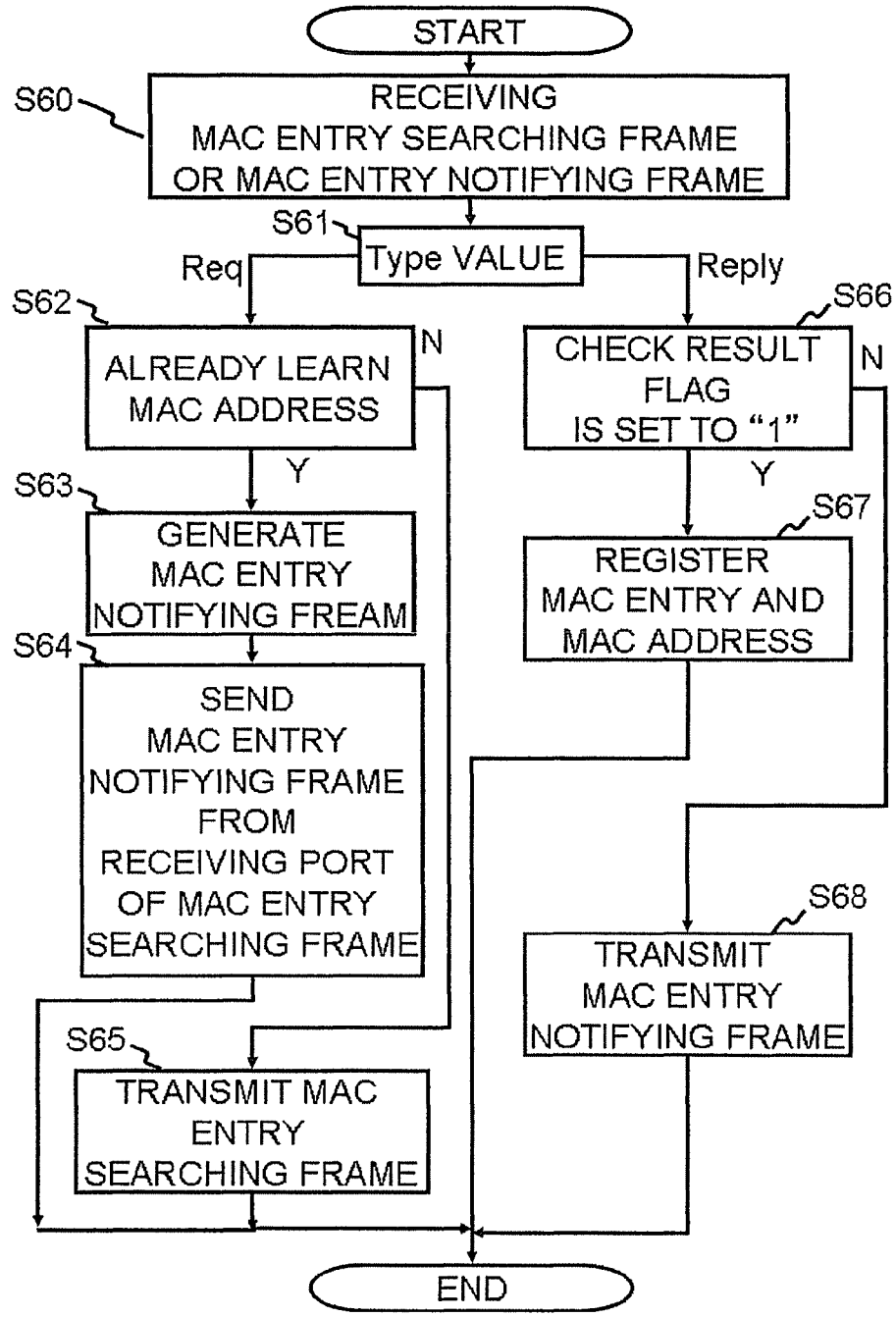
FIG. 20 is a flowchart of processing in the case where the MAC entry searching frame or MAC entry notifying frame is received.

Referring to a flowchart of FIG. 20, a description will be made of processing of a Layer 2 switch that received the MAC entry searching frame like the Layer 2 switches SW1 and SW3. FIG. 20 is a flowchart of processing in the case where the MAC entry searching frame or MAC entry notifying frame is received.

In step S60, the MAC entry searching/notifying frame receiving unit 33 receives one of the MAC entry searching frame and the MAC entry notifying frame.

In step S61, the MAC entry searching/notifying frame receiving unit 33 references a value in the Type field to thereby determine whether the received frame is the MAC entry searching frame or the MAC entry notifying frame. Further, the MAC entry searching/notifying frame receiving unit 33 notifies the MAC entry searching/notifying frame transmitting unit 32 about which port received this frame.

If the received frame is the MAC entry searching frame 141, the MAC entry searching/notifying frame receiving unit 33 notifies the MAC entry searching unit 34 of a MAC address stored in the MAC entry field. Then, the processing advances to step S62.

In step S62, the MAC entry searching unit 34 determines whether the MAC table 5 stores a MAC entry regarding the MAC address inquired by the MAC entry searching frame 141.

In step 63, the MAC entry searching/notifying frame transmitting unit 32 generates the MAC entry notifying frame 142 indicating that the MAC table 5 stores a MAC entry regarding the MAC address inquired by the MAC entry searching frame 141 when the MAC table 5 stores the MAC entry.

In step S64, the MAC entry searching/notifying frame transmitting unit 32 transmits the MAC entry notifying frame 142 from a port that received the MAC entry searching frame 141.

If it is determined in step S62 that a MAC entry is not stored in the MAC table 5, the MAC entry searching/notifying frame transmitting unit 32 sends the MAC entry searching frame 141 from a WAN side port different from the frame-received port in step S65.

Here, if an applicable range of a Layer 2 switch Y that receives the MAC entry searching frame 141 from a Layer 2 switch X is limited to switches adjacent to the Layer 2 switch X, step S65 as a step of transferring the MAC entry searching frame 141 is skipped.

Referring back to FIG. 14, the MAC entry registering unit 35 of the Layer 2 switch SW2 that received the MAC entry notifying frame 142 determines whether flooding having occurred at the MAC address a notified by the MAC entry notifying frame 142 is determined to satisfy a predetermined condition, more specifically, whether the result check flag for the MAC address a stored in the failed-learning flag table 21 is set to "1".

If it is determined that flooding having occurred at the MAC address a satisfies a predetermined condition, the MAC entry registering unit 35 registers a MAC entry including a pair of the MAC address a and the port p2 that received the MAC entry: notifying frame 142, in the MAC table MT2b.

Referring to a flowchart of FIG. 20, a description will be given of processing of a Layer 2 switch that received the MAC entry notifying frame like the Layer 2 switch SW2.

In step S60, the MAC entry searching/notifying frame receiving unit 33 receives one of the MAC entry searching frame and the MAC entry notifying frame.

In Step S61, the MAC entry searching/notifying frame receiving unit 33 determines whether the received frame is the MAC entry searching frame or the MAC entry notifying frame. Further, the MAC entry searching/notifying frame receiving unit 33 notifies the MAC entry searching/notifying frame transmitting unit 32 about which port received this frame.

If the received frame is the MAC entry notifying frame 142, the MAC entry searching/notifying frame receiving unit 33 notifies the MAC entry registering unit 35 of a MAC address stored in the MAC entry field. Then, the processing advances to step S66.

In step S66, the MAC entry registering unit 35 determines whether the check result flag for the MAC address notified by the MAC entry searching frame 141, which is stored in the failed-learning flag table 21, is set to "1".

If it is determined that the check result flag is set to "1", more specifically, flooding having occurred at the MAC address notified by the MAC entry searching frame 141 satisfies a predetermined condition, the MAC entry registering unit 35 registers a MAC entry including a pair of the MAC address notified by the MAC entry notifying frame and a port that received the MAC entry notifying frame 1, in the MAC table 5 in step S67.

If it is determined in step S66 that the result check flag is not set to "1", the MAC entry searching/notifying frame transmitting unit 32 transmits the MAC entry notifying frame 142 from the WAN side port different from the frame-received port in step S68.

Here, if an applicable range of the Layer 2 switch Y that receives the MAC entry searching frame 141 from any Layer 2 switch X is limited to switches adjacent to the Layer 2 switch X, step S68 as a step of transferring the MAC entry notifying frame 142 is skipped.

Figure 21:
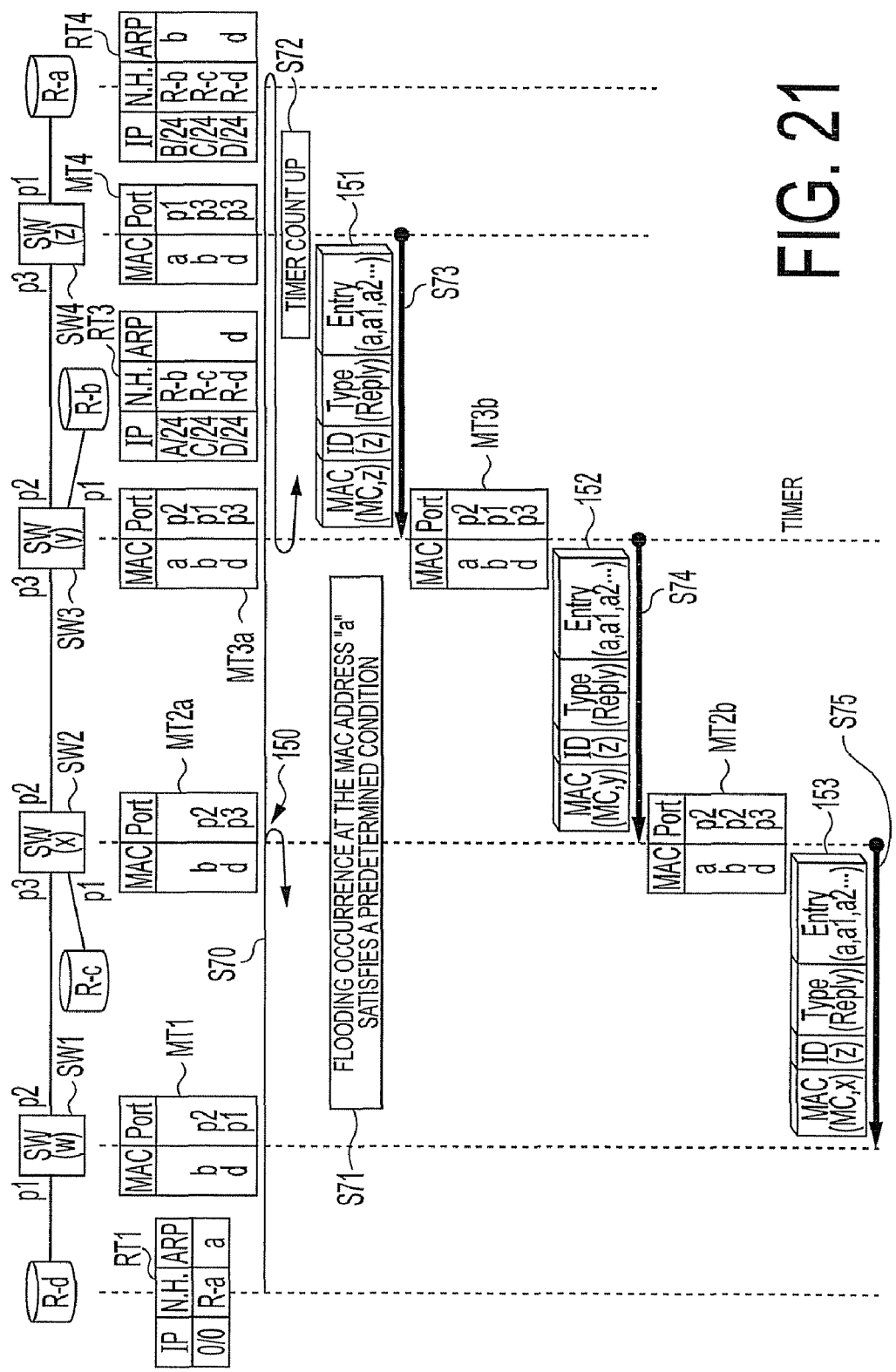
FIG. 21 is a sequence diagram illustrating a second operational example of the frame switching device disclosed herein.

FIG. 21 is a sequence diagram illustrating a second operational example of the frame switching device disclosed herein. Reference symbols given to the MAC addresses of the Layer 2 switches SW1, SW2, SW3, and SW4, the routing table, the ART table, and the Mac table are similar to those in the example illustrated in FIG. 14.

In step S70, a frame is transmitted from the router R-d on the deleted-address table 22 LAN to the data center. As a result, flooding occurs in the Layer 2 switch SW2 as indicated by reference numeral 150.

In step S71, if it is determined that flooding having occurred at the MAC address a satisfies a predetermined condition, the flooding monitoring unit 31 of the Layer 2 switch SW2 sets the result check flag for the MAC address a stored in the failed-learning flag table 21 to "1". Processing of the flooding monitoring unit 31 in step S71 is similar to the processing described with reference to FIGS. 15 to 18.

In step S72, if it is detected that a predetermined transmission period Tc measured with the timer means elapses, the MAC entry searching/notifying frame transmitting unit 32 of the Layer 2 switch SW4 generates a MAC entry notifying frame 151.

Then MAC entry notifying frame 151 is a frame stored in the MAC table 5 of the Layer 2 switch SW4 as a sender, and used to notify the other switches SW1, SW2, and SW3 on the Layer 2 network to which the Layer 2 switch SW4 belongs, of MAC addresses a, a1, a2, . . . which have been learned at the LAN-side port by the switch SW4.

In the MAC entry notifying frame 151, a destination address is a multicast address MC used in the MAC entry searching frame and MAC entry notifying frame described above with reference to FIG. 13, a sender MAC address is a MAC address z of the Layer 2 switch SW4, a value in the ID field is the MAC address z of the Layer 2 switch SW4, a value in the Type field is "Reply" indicating the MAC entry notifying frame, and the MAC addresses a, a1, a2, . . . learned at the LAN side port by the Layer 2 switch SW4 are stored in the MAC entry field.

Then, in step S73, the MAC entry searching/notifying frame transmitting unit 32 broadcast-transmits the MAC entry notifying frame 151 from every WAN side port of the Layer 2 switch SW4. The Layer 2 switch SW4 transmits the MAC entry notifying frame 151 at regular intervals through the processing in steps S72 and S73.

Figure 22:
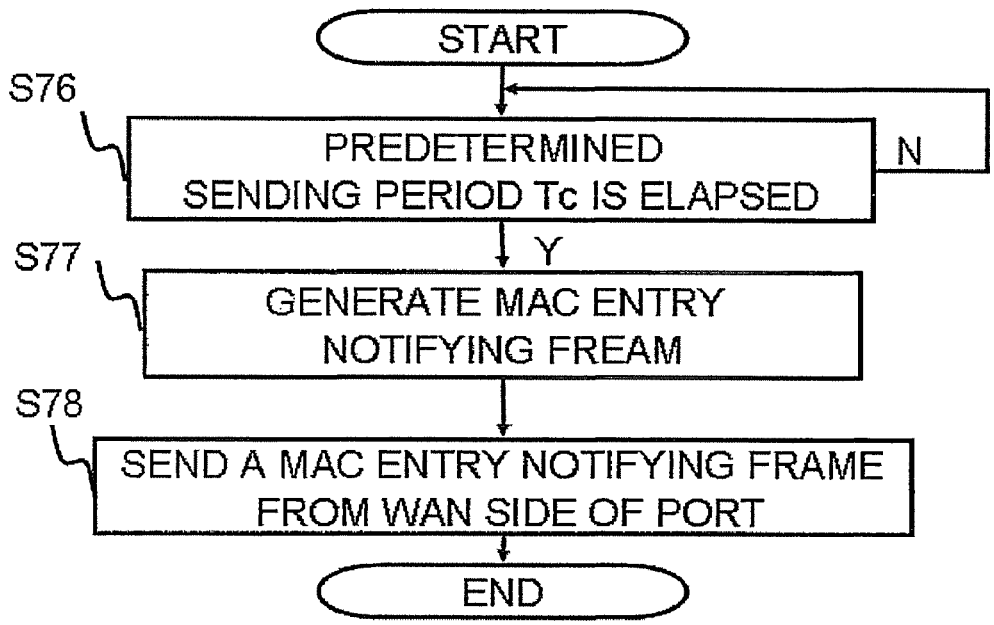
FIG. 22 is a flowchart illustrating processing for transmitting a MAC entry notifying frame.

Referring to a flowchart of FIG. 22, a description is given of the processing of the Layer 2 switch for transmitting the MAC entry notifying frame 151 at regular intervals like the Layer 2 switch SW4. FIG. 22 is a flowchart illustrating the processing for transmitting a MAC entry notifying frame.

In step S76, the MAC entry searching/notifying frame transmitting unit 32 illustrated in FIG. 12 determines whether a predetermined transmission period Tc elapses, more specifically, whether to transmit a MAC entry notifying frame now. If the predetermined transmission period Tc does not elapse, the MAC entry searching/notifying frame transmitting unit 32 returns the processing to step S76.

If the predetermined transmission period Tc elapses, the MAC entry searching/notifying frame transmitting unit 32 collects MAC addresses learned at the LAN side port, more specifically, sender MAC addresses of MAC frames having arrived at the LAN side port, from MAC entries stored in the MAC table 5 in step S77.

The MAC entry searching/notifying frame transmitting unit 32 generates the MAC entry notifying frame 151 having the collected sender MAC address in the MAC entry field.

In step S78, the MAC entry searching/notifying frame transmitting unit 32 transmits the MAC entry notifying frame 151 from all ports defined as the WAN side port in the port setting table 20.

Referring back to FIG. 21, the MAC entry notifying frame 151 transmitted from the Layer 2 switch SW4 is received by the Layer 2 switch SW3.

The Layer 2 switch SW3 changes the sender MAC address of the received MAC entry notifying frame 151 to the MAC address y of the Layer 2 switch SW3, and transfers the changed MAC entry notifying frame 152 to the Layer 2 switch SW2 in step S74.

The Layer 2 switch SW2 changes a sender MAC address of the received MAC entry notifying frame 152 to the MAC address x of the Layer 2 switch SW2, and transfers the changed MAC entry notifying frame 153 to the Layer 2 switch SW1 in step S75.

The MAC entry registering unit 35 of the Layer 2 switch SW3 determines whether flooding having occurred at the MAC addresses a, a1, a2, . . . notified by the MAC entry notifying frame 151 satisfies a predetermined condition, more specifically, whether the result check flag for the MAC addresses stored in the failed-learning flag table 21 is set to "1".

In this embodiment, it, is assumed that the MAC address "a" is already registered in the MAC table MT3a of the Layer 2 switch SW3 and thus, the result check flag for the MAC address a notified by the MAC entry notifying frame 151 is not set to "1", and the result check flag for the MAC addresses a1, a2, . . . is not set to "1" either. Therefore, the MAC entry registering unit 35 of the Layer 2 switch SW3 does not add a new MAC entry to the MAC table MT3b.

The MAC entry registering unit 35 of the Layer 2 switch SW2 also determines whether flooding having occurred at the MAC addresses a, a1, a2, . . . notified by the MAC entry notifying frame 152 satisfies a predetermined condition.

As described above, the result check flag for the MAC address a stored in the failed-learning flag table 21 of the Layer 2 switch SW2 is set to "1". Thus, the MAC entry registering unit 35 of the Layer 2 switch SW2 adds a new MAC entry regarding the MAC address a as indicated by the MAC table MT2b. The added MAC entry includes a pair of the MAC address a and the port p2 that received the MAC entry notifying frame 152.

Figure 23:
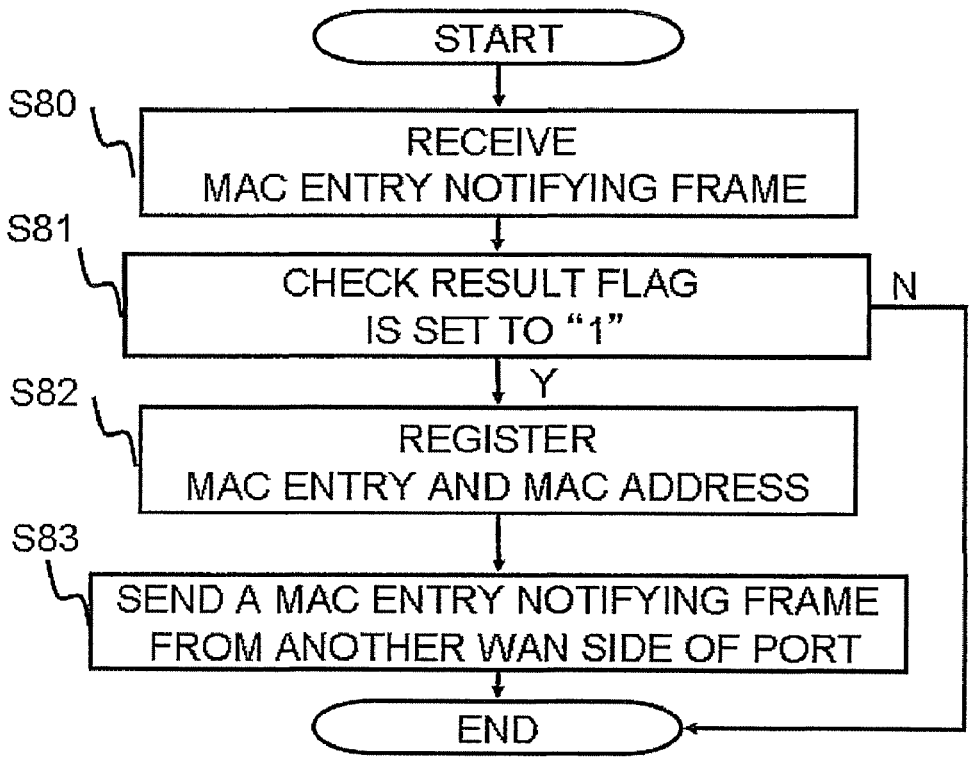
FIG. 23 is a flowchart of processing for receiving a MAC entry notifying frame.

Referring to a flowchart of FIG. 23, a description is given of processing of the Layer 2 switch having received the MAC entry notifying frame 151 and the MAC entry notifying frame 152 like the Layer 2 switches SW3 and SW2. FIG. 23 is a flowchart of processing for receiving the MAC entry notifying frame.

In step S80, the MAC entry searching/notifying frame receiving unit 33 in FIG. 12 receives the MAC entry notifying frame such as the MAC entry notifying frames 151, 152, and 153. Further, the MAC entry searching/notifying frame receiving unit 33 notifies the MAC entry searching/notifying frame transmitting unit 32 of which port receives this frame.

In step S81, the MAC entry registering unit 35 determines whether flooding having occurred at the MAC addresses notified by the MAC entry notifying frame 151 satisfies a predetermined condition, more specifically, whether the result check flag for the MAC addresses stored in the failed-learning flag table 21 is set to "1". The result check flag is not set to "1", the processing shifts to step S83.

If it is determined in step S81 that the result check flag is set to "1", in step S82, the MAC entry registering unit 35 adds a new MAC entry regarding the MAC address for which the result check flag is set to "1" among the notified MAC addresses, to the MAC table 5. The added MAC entry includes a pair of a MAC address and a port that received the MAC entry notifying frame.

In step S83, the MAC entry searching/notifying frame transmitting unit 32 changes the sender MAC address of the received MAC entry notifying frame to the MAC address of the switch 1.

The MAC entry searching/notifying frame transmitting unit 32 transmits the MAC entry notifying frame from all WAN side ports but the port that received the frame in step S80.

Figure 24:
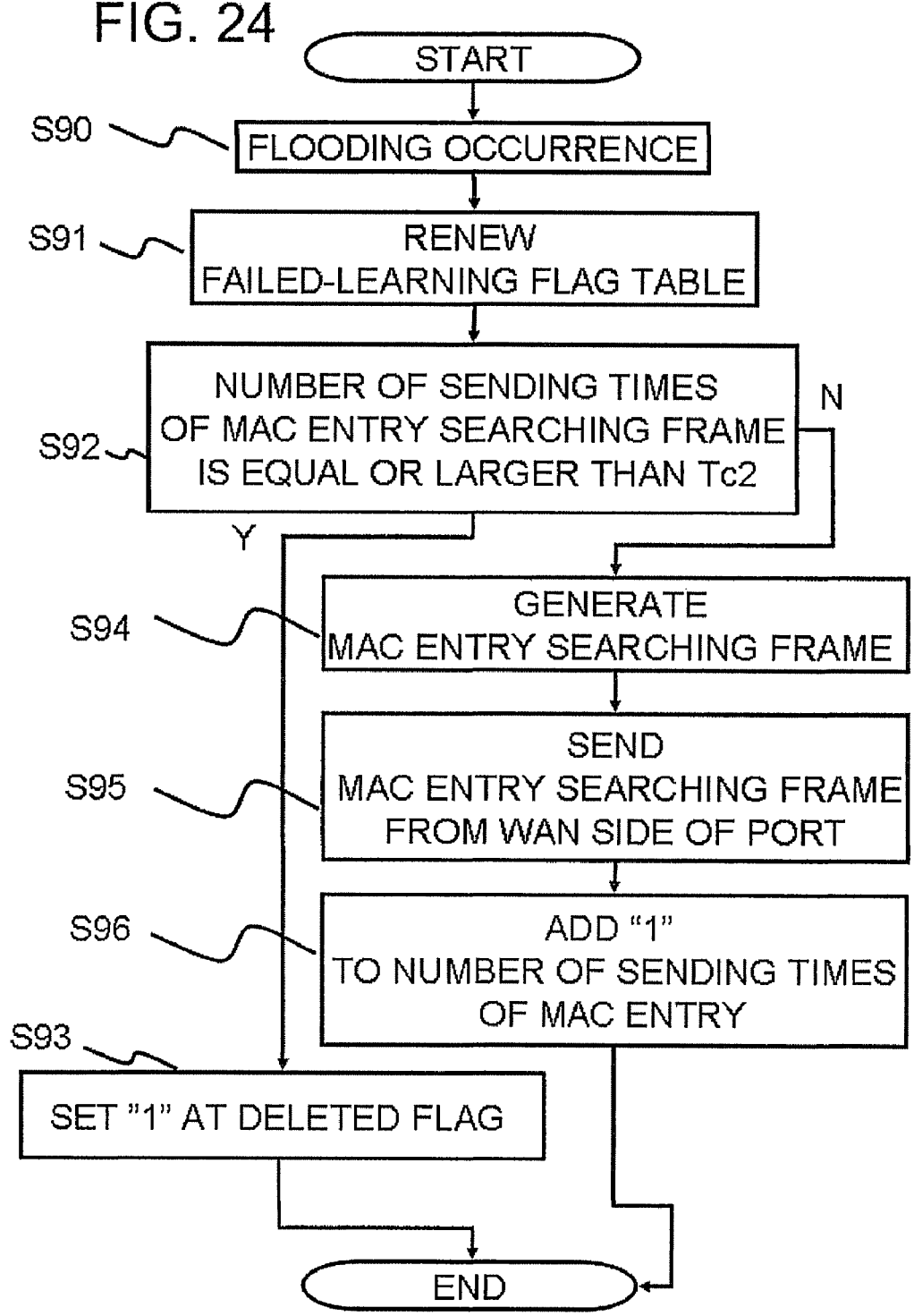
FIG. 24 is a flowchart illustrating a first example of processing for deleting a frame with a MAC complementation determination unit and a frame deleting unit.

Next, processing of the MAC complement determination unit 40 and the frame deleting unit 41 illustrated in FIG. 12 is described. FIG. 24 is a flowchart illustrating, a first example of processing for deleting a frame with the MAC complement determination unit 40 and the frame deleting unit 41.

In step S90, if the flooding processor 6 of FIG. 12 detects flooding, the flooding monitoring unit 31 updates data in the failed-learning flag table 21 in step S91. The processing of the flooding monitoring unit 31 in step S91 is similar to the processing described with reference to FIGS. 15 to 18.

In step S92, the MAC complement determination unit 40 references the deleted-address table 22 illustrated in FIG. 12 to determine whether the number of transmission operations for the MAC entry searching frame is equal to or larger than the threshold value Tc2 in relation to each MAC address for which the result check flag is set to "1" and which is stored in the failed-learning flag table 21.

FIG. 25 illustrates a first example of the data structure of the deleted-address table 22. The deleted-address table 22 includes a MAC field storing MAC addresses stored in the failed-learning flag table 21, a transmission number field storing the number of transmission operations for the MAC entry searching frame in relation to each MAC address, and a deletion flag field storing a deletion flag indicating whether the number of transmission operations for the MAC entry searching frame is equal to or larger than the threshold value Tc2 in relation to each MAC address. The deletion flag set to a value "0" indicates that the number of transmission operations is less than the threshold value Tc2. The flag set to a value "1" indicates that the number of transmission operations is equal to or larger than the threshold value Tc2.

The deleted-address table 22 and the failed-learning flag table 21 may be combined into one table.

If it is determined that the number of transmission operations for the MAC entry searching frame is not equal to or larger than the threshold value Tc2 in step S92 of FIG. 24, in steps S94 and S95, the MAC entry searching/notifying frame transmitting unit 32 generates and transmits the MAC entry searching frame in the same way as in steps S52 and S53 of FIG. 19.

The MAC complement determination unit 40 increments, by 1, the number of transmission operations stored in the deleted-address table 22 in relation to the MAC address to which the MAC entry searching frame is transmitted in step S95.

In step S93, the MAC complement determination unit 40 sets the deletion flag stored in the deleted-address table 22 to "1" in relation to the MAC address for which it is determined in step S92 that the number of transmission operations for the MAC entry searching frame is equal to or larger than the threshold value Tc2.

The frame deleting unit 41 outputs to the frame switching unit 4, an instruction signal indicating the unit to delete the MAC frame having the MAC address for which the deletion flag is set to "1" as a destination address.

According to this embodiment, in the case where the other switches send no response although the MAC entry searching frame is transmitted in a number equal to or larger than the predetermined value Tc2, such a frame having the destination MAC address is deleted, not subjected to flooding processing, making it possible to prevent distribution of frames sent to a MAC address that is not found on the network.

Figure 26:
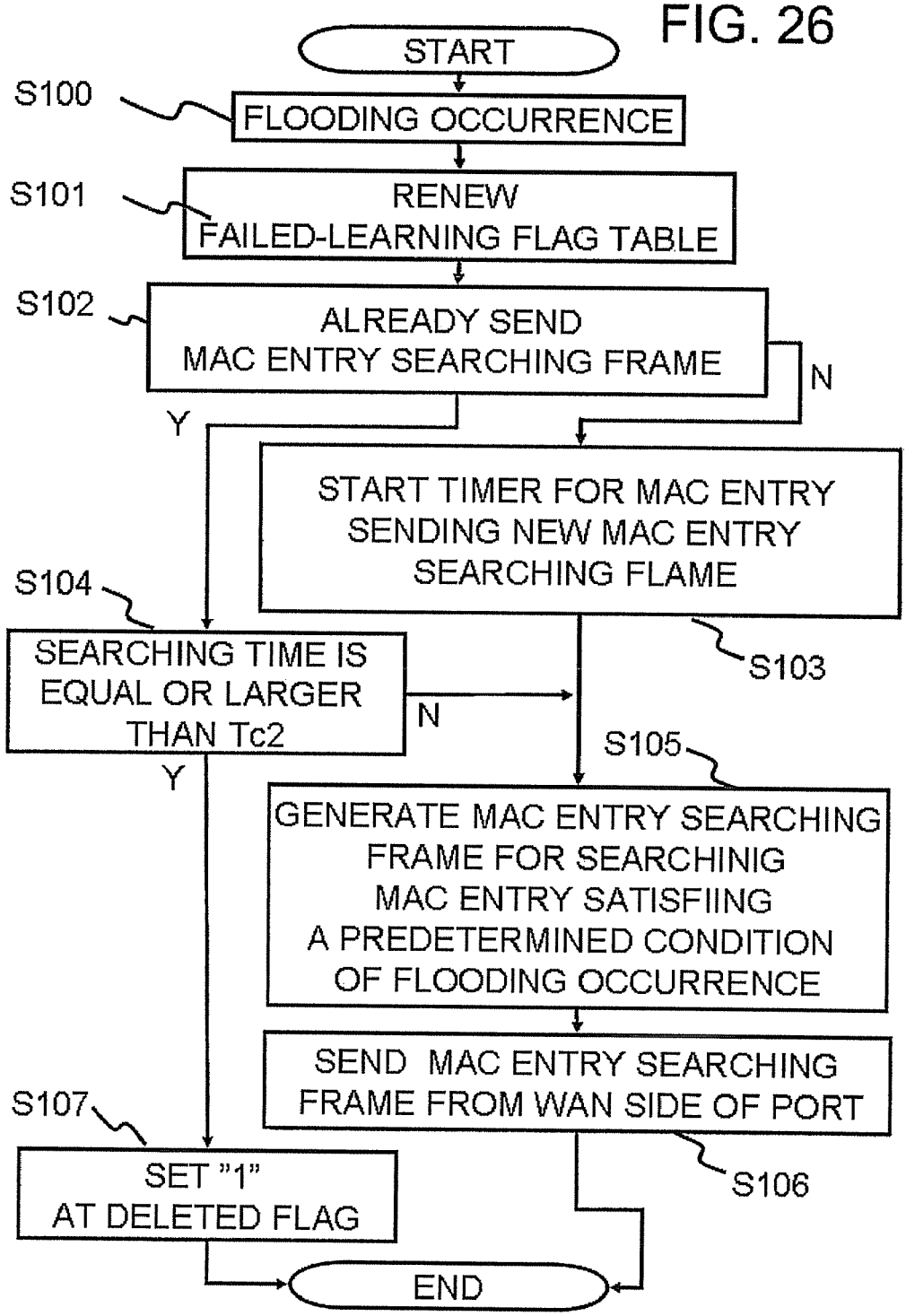
FIG. 26 is a flowchart illustrating a second example of processing for deleting a frame with a MAC complementation determination unit and a frame deleting unit.

FIG. 26 is a flowchart illustrating a second example of processing for deleting a frame with the MAC complement determination unit 40 and the frame deleting unit 41.

In step S100, if the flooding processor 6 detects flooding, in step S101, the flooding monitoring unit 31 updates data in the failed-learning flag table 21. The processing of the flooding monitoring unit 31 in step S101 is similar to the processing described with reference to FIGS. 15 to 18.

In step S102, the MAC complement determination unit 40 determines whether the MAC entry searching frame has been transmitted in relation to each MAC address for which the result check flag is set to "1" in the failed-learning flag table 21. For example, this determination can be made such that the MAC complement determination unit 40 compares the failed-learning flag table 21 before step S101 with the failed-learning flag table 21 after step S101 to determine whether the result check flag is changed from "0" to "1".

The MAC complement determination unit 40 activates timer means for measuring an elapsed time from when transmission of the MAC entry searching frame is started up to a current time in relation to the MAC address for which it is determined in step S102 that the MAC entry searching frame is not transmitted, and then returns the processing to step S105.

In step S104, the MAC complement determination unit 40 references a search time corresponding to the elapsed time from when transmission of the MAC entry searching frame is started up to a current time, which is stored in the deleted-address table 22, in relation to the MAC address for which it is determined in step S102 that the MAC entry searching frame is transmitted.

FIG. 27 illustrates a second example of the data structure of the deleted-address table 22.

The deleted-address table 22 includes a MAC field storing the MAC address stored in the failed-learning flag table 21, a search time field storing an elapsed time from when transmission of the MAC entry searching frame is started up to a current time in relation to each MAC address, that is, a search time, and a deletion flag field storing a deletion flag indicating whether a search time for each MAC address is equal to or longer than a threshold value Tt2.

The deletion flag set to a value "0" indicates that the search time is shorter than the threshold value Tt2, and the flag set to a value "1" indicates that the search time is equal to or longer than the threshold value Tt2. Further, elapsed time information stored in the search time field is updated by the timer means.

The deleted-address table 22 and the failed-learning flag table 21 may be combined into one table.

In step S104 of FIG. 26, the MAC complement determination unit 40 determined whether the search time for each MAC address stored in the deleted-address table 22 is equal to or longer than the threshold value Tt2. The processing advances to S105 for the MAC address for which the search time is not equal to or longer than the threshold value Tt2.

In steps S105 and S106, the MAC entry searching/notifying frame transmitting unit 32 generates and transmits the MAC entry searching frame in the same way as in steps S52 and S53 in FIG. 19.

In step S107, the MAC complement determination unit 40 sets the deletion flag stored in the deleted-address table 22 to "1" in relation to the MAC address for which it is determined in step S104 that the search time is not equal to or longer than the threshold value Tt2.

The frame deleting unit 41 outputs to the frame switching unit 4, an instruction: signal that instructs the unit to delete the MAC address for which the deletion flag is set to "1" as a destination address.

According to this embodiment, in the case where the other switches send not response even after the predetermined period Tt2 or more elapses from when the MAC entry searching frame was transmitted, such a frame having the destination MAC address is deleted, not subjected to flooding processing, making it possible to prevent distribution of frames sent to a MAC address not found in the network.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A frame switching device for switching frames in a frame switching network, the frame switching device being communicably coupled to other frame switching devices via the frame switching network, the frame switching device comprising:

a plurality of ports communicably coupled to the other frame switching devices in the frame switching network each of the plurality of ports sending a sending frame and receiving a frame;

a first address entry memory for storing one or more address entries, each storing a first address indicating a sender address of a frame that was received via a first port, in association with the first port;

a flooding processor to execute a flooding process for a second address when the second address is not stored in any one of the one or more address entries of the first address entry memory, the second address indicating a destination address of a frame that is to be sent from the frame switching device; and a processor to:

determine whether one of first and second events for the second address has occurred or not, the first event indicating that the number of times of executing the flooding process for the second address exceeds a first threshold value, the second event indicating that a time period during which the flooding process for the second address is being executed exceeds a second threshold value;
receive a predetermined notification message including addresses that are being stored in at least one address entry of a second address entry memory provided for each of the other frame switching devices, via a second port from the each of the other frame switching devices, and
register an address entry that is storing the second address in association with the second port, in the first address entry memory when the second address is included in the received predetermined notification message and it is determined that one of the first and second events for the second address has occurred.

2. The frame switching device of claim 1, wherein the processor transmits a searching frame to the other frame switching devices when it is determined that one of the first and second events for the second address has occurred the searching frame including the second address for which the flooding processing has been executed.

3. The frame switching device of claim 2, wherein:
the processor determines whether the predetermined notification message including the second address has been received within a predetermined time period after transmitting the search frame; and
the processor discards a frame including the second address as a destination address, when it is determined that the predetermined notification message including the second address has not been received within the predetermined time period after transmitting the search frame.

4. The frame switching device of claim 1, wherein
the processor periodically transmits an address entry notification message including addresses that are being stored in the one or more address entries of the first address entry memory to each of the other frame switching devices.

5. The frame switching device of claim 1, wherein the processor is further configured:
to determine whether the predetermined notification message including the second address has been received before the search frame is transmitted predetermined times; and
to delete a frame including the second address as a destination address, when it is determined that the predetermined notification message including the second address was not received before the search frame is transmitted the predetermined times.

6. A communication system comprising:
a frame switching network transmitting frames;
a first frame switching device to be coupled to the frame switching network; and
a second frame switching device to be coupled to the frame switching network, wherein the first frame switching device includes:
a plurality of first ports communicably coupled to the second frame switching device, each of the plurality of the first ports sending a frame and receiving a frame,
a first address entry memory for storing one or more address entries, each storing a first address indicating a sender address of a frame that was received via one of the plurality of first ports, in association with the one of the plurality of first ports, and
a first flooding processor for executing a flooding process for a second address when the second address is not stored in any one of the one or more address entries of the first address entry memory, the second address indicating a destination address of a frame that is to be sent from the first frame switching device; and
the second frame switching device includes:
a plurality of second ports communicably coupled to the first frame switching device, each of the plurality of the second ports sending a frame and receiving a frame, and
a second address entry memory for storing at least one address entry, each storing a third address indicating a sender address of a frame that was received via one of the plurality of second ports, in association with the one of the plurality of second port, wherein:
the first frame switching device determines whether one of first and second events for the second address has occurred or not, the first event indicating that the number of times of executing the flooding process for the second address exceeds a first threshold value, the second event indicating that a time period during which the flooding process for the second address is being executed exceeds a second threshold value,
the first frame switching device receives a predetermined notification message including addresses that are being stored in the at least one address entry of the second address entry memory, from the second frame switching device via the frame switching network, and
the first frame switching device registers an address entry storing the second address in the first address entry memory, in association with one of the plurality of first ports via which the predetermined notification message was received, when the second address is included in the received predetermined notification message and it is determined that one of the first and second events for the second address has occurred.

7. The communication system of claim 6, wherein
the first frame switching device transmits a searching frame to the second frame switching device when it is determined that one of the first and second events for the second address has occurred, the searching frame including the second address, and
the second frame switching device transmits, in response to the search frame received from the first frame switching device, the predetermined notification message including the second address, to the first frame switching device when the second address is being stored in the at least one address entry of the second address entry memory.

8. The communication system of claim 6, wherein
the second frame switching device periodically transmits the predetermined notification message including addresses that are being stored in one or more address entries of the second address entry memory, to the first frame switching device.

9. An address learning method for frame switching device switching frames in a frame switching network, the frame switching device being communicably coupled to other frame switching devices via the frame switching network, the address learning method comprising:
sending a frame
receiving a frame;
providing the frame switching device with one or more address entries, each storing a first address indicating a sender address of a frame that was received via a first port of the frame switching device, in association with the first port;

executing a flooding process for a second address when the second address is not being stored in any one of the one or more address entries;

determining whether one of first and second events for the second address has occurred or not, the first event indicating that the number of times of executing the flooding process for the second address exceeds a first threshold value, the second event indicating that a time period during which the flooding process for the second address is being executed exceeds a second threshold value;

receiving a predetermined notification message including addresses that are being stored in at least one address entry provided for each of the other frame switching devices, from the each of the other frame switching devices, via a second port of the frame switching device, the second port being communicably coupled to the each of the other frame, switching devices through the frame switching network; and registering an address entry storing the second address in association with the second port when the second address is included in the received predetermined notification message and it is determined that one of the first and second events for the second address has occurred.

10. The address learning method of claim 9, further comprising transmitting a searching frame to the other frame switching devices when it is determined that one of the first and second events for the second address has occurred, the searching frame including the second address.

* * * * *

UNITED STATES PATENT AND TRADEMARK OFFICE
CERTIFICATE OF CORRECTION

PATENT NO.         : 8,243,741 B2
APPLICATION NO.    : 12/536678
DATED              : August 14, 2012
INVENTOR(S)        : Atsushi Kitada et al.

It is certified that error appears in the above-identified patent and that said Letters Patent is hereby corrected as shown below:

Column 24, Line 4, In Claim 9, delete "frame," and insert -- frame --, therefor.

Signed and Sealed this
Twenty-third Day of October, 2012

David J. Kappos
*Director of the United States Patent and Trademark Office*